United States Patent
Saxe et al.

(10) Patent No.: US 12,248,572 B2
(45) Date of Patent: *Mar. 11, 2025

(54) METHODS AND APPARATUS FOR USING MACHINE LEARNING ON MULTIPLE FILE FRAGMENTS TO IDENTIFY MALWARE

(71) Applicant: Sophos Limited, Abingdon (GB)

(72) Inventors: Joshua Daniel Saxe, Wichita, KS (US); Richard Harang, Alexandria, VA (US)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,587

(22) Filed: Mar. 20, 2023

(65) Prior Publication Data

US 2023/0229772 A1 Jul. 20, 2023

Related U.S. Application Data

(63) Continuation of application No. 16/853,803, filed on Apr. 21, 2020, now Pat. No. 11,609,991, which is a (Continued)

(51) Int. Cl.
*H04L 29/06* (2006.01)
*G06F 21/56* (2013.01)
(Continued)

(52) U.S. Cl.
CPC .......... *G06F 21/565* (2013.01); *G06F 21/562* (2013.01); *G06F 21/563* (2013.01);
(Continued)

(58) Field of Classification Search
CPC ...... G06F 21/563; G06F 21/56; G06F 21/565; G06F 21/562; H04L 63/14; H04L 63/02
(Continued)

(56) References Cited

U.S. PATENT DOCUMENTS

| 7,069,589 B2 | 6/2006 | Schmall et al. |
| 7,204,152 B2 | 4/2007 | Woodward et al. |

(Continued)

FOREIGN PATENT DOCUMENTS

| CA | 2799691 C | 9/2014 |
| JP | 2012027710 A | 2/2012 |

(Continued)

OTHER PUBLICATIONS

Notice of Allowance for U.S. Appl. No. 15/884,542 dated Jul. 13, 2023, 13 pages.

(Continued)

*Primary Examiner* — Longbit Chai
(74) *Attorney, Agent, or Firm* — COOLEY LLP

(57) ABSTRACT

In some embodiments, a method includes processing at least a portion of a received file into a first set of fragments and analyzing each fragment from the first set of fragments using a machine learning model to identify within each fragment first information potentially relevant to whether the file is malicious. The method includes forming a second set of fragments by combining adjacent fragments from the first set of fragments and analyzing each fragment from the second set of fragments using the machine learning model to identify second information potentially relevant to whether the file is malicious. The method includes identifying the file as malicious based on the first information within at least one fragment from the first set of fragments and the second information within at least one fragment from the second set of fragments. The method includes performing a remedial action based on identifying the file as malicious.

20 Claims, 8 Drawing Sheets

Related U.S. Application Data continuation of application No. 15/727,035, filed on Oct. 6, 2017, now Pat. No. 10,635,813.

(51) Int. Cl.
  *G06N 3/084* (2023.01)
  *G06N 5/04* (2023.01)
  *G06N 20/00* (2019.01)

(52) U.S. Cl.
  CPC ............... *G06N 3/084* (2013.01); *G06N 5/04* (2013.01); *G06N 20/00* (2019.01)

(58) Field of Classification Search
  USPC ........................................................ 726/24
  See application file for complete search history.

(56) References Cited

U.S. PATENT DOCUMENTS

| | | | |
|---|---|---|---|
| 7,219,148 B2 | 5/2007 | Rounthwaite et al. | |
| 7,545,986 B2 | 6/2009 | Bachmann | |
| 7,558,832 B2 | 7/2009 | Rounthwaite et al. | |
| 7,711,663 B2 | 5/2010 | Weng | |
| 7,769,772 B2 | 8/2010 | Weyl et al. | |
| 7,934,103 B2 | 4/2011 | Kidron | |
| 8,458,794 B1 | 6/2013 | Sallam | |
| 8,635,700 B2 | 1/2014 | Richard et al. | |
| 8,709,924 B2 | 4/2014 | Hanawa et al. | |
| 9,189,730 B1 | 11/2015 | Coenen et al. | |
| 9,404,833 B2 | 8/2016 | Stadlbauer et al. | |
| 9,465,940 B1 | 10/2016 | Wojnowicz et al. | |
| 9,514,391 B2 | 12/2016 | Perronnin et al. | |
| 9,531,742 B2 | 12/2016 | Kohout et al. | |
| 9,672,358 B1 | 6/2017 | Long et al. | |
| 9,680,868 B2 | 6/2017 | Bailey et al. | |
| 9,690,938 B1 | 6/2017 | Saxe et al. | |
| 9,721,097 B1 | 8/2017 | Davis et al. | |
| 9,792,492 B2 | 10/2017 | Soldevila et al. | |
| 9,807,113 B2 | 10/2017 | Yang et al. | |
| 9,864,956 B1 | 1/2018 | Sai | |
| 10,015,150 B2 | 7/2018 | Basin | |
| 10,193,902 B1 * | 1/2019 | Caspi ..................... G06F 21/564 |
| 10,521,587 B1 | 12/2019 | Agranonik et al. | |
| 10,599,844 B2 | 3/2020 | Schmidtler et al. | |
| 10,635,813 B2 | 4/2020 | Saxe et al. | |
| 10,742,591 B2 | 8/2020 | Nguyen et al. | |
| 10,834,128 B1 | 11/2020 | Rajagopalan et al. | |
| 10,956,477 B1 | 3/2021 | Fang et al. | |
| 11,003,774 B2 | 5/2021 | Saxe et al. | |
| 11,063,881 B1 | 7/2021 | Vijayasuganthan et al. | |
| 11,069,082 B1 | 7/2021 | Ebrahimi Afrouzi et al. | |
| 11,270,205 B2 | 3/2022 | Harang | |
| 11,321,607 B2 | 5/2022 | Shah et al. | |
| 11,409,869 B2 | 8/2022 | Schmidtler et al. | |
| 11,574,052 B2 | 2/2023 | Harang | |
| 11,609,991 B2 | 3/2023 | Saxe et al. | |
| 11,822,374 B2 | 11/2023 | Saxe et al. | |
| 11,941,491 B2 | 3/2024 | Harang et al. | |
| 11,947,668 B2 | 4/2024 | Harang | |
| 12,010,129 B2 | 6/2024 | Vörös et al. | |
| 2006/0013475 A1 | 1/2006 | Philomin et al. | |
| 2008/0025208 A1 | 1/2008 | Chan | |
| 2009/0003264 A1 | 1/2009 | Sastry | |
| 2009/0122718 A1 | 5/2009 | Klessig et al. | |
| 2009/0254992 A1 | 10/2009 | Schultz et al. | |
| 2009/0300765 A1 | 12/2009 | Moskovitch et al. | |
| 2013/0067579 A1 | 3/2013 | Beveridge et al. | |
| 2014/0090061 A1 * | 3/2014 | Avasarala ............. G06F 21/566 726/24 |
| 2014/0143869 A1 | 5/2014 | Pereira et al. | |
| 2015/0046850 A1 | 2/2015 | Kurabayashi | |
| 2015/0067853 A1 | 3/2015 | Amrutkar et al. | |
| 2015/0213376 A1 | 7/2015 | Ideses et al. | |
| 2015/0363294 A1 | 12/2015 | Carback, III et al. | |
| 2016/0065597 A1 | 3/2016 | Nguyen et al. | |
| 2016/0217368 A1 | 7/2016 | Ioffe et al. | |
| 2016/0218933 A1 | 7/2016 | Porras et al. | |
| 2016/0253500 A1 | 9/2016 | Alme et al. | |
| 2017/0046616 A1 | 2/2017 | Socher et al. | |
| 2017/0078317 A1 | 3/2017 | Gertner et al. | |
| 2017/0092264 A1 | 3/2017 | Hakkani-Tur et al. | |
| 2017/0109615 A1 | 4/2017 | Yatziv et al. | |
| 2017/0212829 A1 | 7/2017 | Bales et al. | |
| 2017/0351948 A1 | 12/2017 | Lee et al. | |
| 2017/0372071 A1 | 12/2017 | Saxe | |
| 2018/0004803 A1 | 1/2018 | Hao et al. | |
| 2018/0053084 A1 | 2/2018 | Li et al. | |
| 2018/0060580 A1 | 3/2018 | Zhao et al. | |
| 2018/0101682 A1 | 4/2018 | Krukov et al. | |
| 2018/0121802 A1 | 5/2018 | Ruckauer et al. | |
| 2018/0129786 A1 | 5/2018 | Khine et al. | |
| 2018/0137642 A1 | 5/2018 | Malisiewicz et al. | |
| 2018/0144242 A1 | 5/2018 | Simard | |
| 2018/0152471 A1 | 5/2018 | Jakobsson | |
| 2018/0211041 A1 | 7/2018 | Davis | |
| 2018/0285740 A1 | 10/2018 | Smyth et al. | |
| 2018/0285773 A1 | 10/2018 | Hsiao et al. | |
| 2018/0288086 A1 | 10/2018 | Amiri et al. | |
| 2018/0293381 A1 | 10/2018 | Tseng et al. | |
| 2019/0065744 A1 | 2/2019 | Gaustad | |
| 2019/0095805 A1 | 3/2019 | Tristan et al. | |
| 2019/0108338 A1 | 4/2019 | Saxe et al. | |
| 2019/0132355 A1 | 5/2019 | Egbert et al. | |
| 2019/0205402 A1 | 7/2019 | Sernau et al. | |
| 2019/0236273 A1 | 8/2019 | Saxe et al. | |
| 2019/0236490 A1 | 8/2019 | Harang et al. | |
| 2019/0258807 A1 | 8/2019 | DiMaggio et al. | |
| 2019/0266492 A1 | 8/2019 | Harang | |
| 2019/0295114 A1 | 9/2019 | Pavletic et al. | |
| 2019/0347287 A1 | 11/2019 | Crossno et al. | |
| 2019/0378050 A1 | 12/2019 | Edkin et al. | |
| 2019/0387005 A1 | 12/2019 | Zawoad et al. | |
| 2020/0097817 A1 | 3/2020 | Harris et al. | |
| 2020/0104636 A1 | 4/2020 | Halevi et al. | |
| 2020/0117975 A1 | 4/2020 | Harang | |
| 2020/0228998 A1 | 7/2020 | Bai et al. | |
| 2020/0250309 A1 | 8/2020 | Harang | |
| 2020/0257799 A1 | 8/2020 | Saxe et al. | |
| 2020/0311586 A1 | 10/2020 | Sandstrom | |
| 2020/0342337 A1 | 10/2020 | Choudhary et al. | |
| 2021/0014247 A1 | 1/2021 | Wosotowsky et al. | |
| 2021/0073377 A1 | 3/2021 | Coull et al. | |
| 2021/0073661 A1 | 3/2021 | Matlick et al. | |
| 2021/0092140 A1 | 3/2021 | Kazerounian et al. | |
| 2021/0093973 A1 | 4/2021 | Edridge et al. | |
| 2021/0120013 A1 | 4/2021 | Hines et al. | |
| 2021/0168165 A1 | 6/2021 | Alsaeed et al. | |
| 2021/0211450 A1 | 7/2021 | Aleidan | |
| 2021/0241175 A1 | 8/2021 | Harang et al. | |
| 2021/0287354 A1 | 9/2021 | Kumar et al. | |
| 2021/0326440 A1 | 10/2021 | Saxe et al. | |
| 2021/0328801 A1 | 10/2021 | Sly et al. | |
| 2021/0328969 A1 | 10/2021 | Gaddam et al. | |
| 2021/0397956 A1 | 12/2021 | Rasamsetti et al. | |
| 2022/0036194 A1 | 2/2022 | Sundaresan et al. | |
| 2022/0083662 A1 | 3/2022 | Grobman et al. | |
| 2022/0083900 A1 | 3/2022 | Khanna | |
| 2022/0124543 A1 | 4/2022 | Orhan et al. | |
| 2022/0284283 A1 | 9/2022 | Yin et al. | |
| 2022/0353284 A1 | 11/2022 | Vörös et al. | |
| 2023/0089380 A1 | 3/2023 | Jiang et al. | |
| 2024/0119150 A1 | 4/2024 | Saxe et al. | |

FOREIGN PATENT DOCUMENTS

| | | |
|---|---|---|
| WO | WO-2007117636 A2 | 10/2007 |
| WO | WO-2019071095 A1 | 4/2019 |
| WO | WO-2019145912 A1 | 8/2019 |
| WO | WO-2019150079 A1 | 8/2019 |
| WO | WO-2019166989 A1 | 9/2019 |
| WO | WO-2020030913 A1 | 2/2020 |

(56) References Cited

FOREIGN PATENT DOCUMENTS

| | | |
|---|---|---|
| WO | WO-2020157479 A1 | 8/2020 |
| WO | WO-2022223940 A1 | 10/2022 |

OTHER PUBLICATIONS

U.S. Appl. No. 16/158,844, Office Action mailed Jun. 29, 2023, 35 pages.
U.S. Appl. No. 17/239,128, Office Action mailed Jul. 12, 2023, 33 pages.
Augasta and Kathirvalavakumar, "Pruning algorithms of neural networks—a comparative study", Cent. Eur. J. Comp. Sci. (2013); 3(3): 105-115.
Ba, et al., "Layer Normalization." [Online] Retrieved from the Internet https://arxiv.org/pdf/1607.06450.pdf, Submitted on Jul. 21, 2016, 14 pages.
Cheplyaka, R., "Rank vs Order in R", Published Mar. 19, 2016, Updated Oct. 30, 2017 https://ro-che.info/articles/2016-03-19-rank-vs-order-r (Year: 2017), 4 pages.
Chiba, Daiki et al., "Detecting Malicious Websites by Learning IP Address Features", 2012 IEEE/IPSJ 12th International Symposium on Applications and the Internet, Jul. 16, 2012 (Jul. 16, 2012), pp. 29-39.
Chiba, et al., "Analyzing Spatial Structure of IP Addresses for Detecting Malicious Websites", Journal of Information Processing (Jul. 2013); 21(3): 539-550.
Corrected Notice of Allowance for U.S. Appl. No. 17/314,625 dated Mar. 29, 2023, 2 pages.
Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.
Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.
Final Rejection Office Action for U.S. Appl. No. 16/158,844 mailed on Jan. 4, 2023, 32 pages.
Harang and Ducau, "Measuring the speed of the Red Queen's Race", BlackHat USA 2018, Aug. 4-9, 2018, Las Vegas, NV, USA, 18 pages.
Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.
Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.
Harang, R. "Estimating weight sharing in multi-task networks via approximate Fisher information," SOPHOS, [online] Retrieved from the Internet https://www.camlis.org/s/harang_CAMLIS17.pdf Oct. 28, 2017, 31 pages.
Huang, L. et al., "Orthogonal Weight Normalization: Solution to Optimization over Multiple Dependent Stiefel Manifolds in Deep Neural Networks," [Online], Retrieved from the Internet: URL: https://arxiv.org/pdf/1709.06079.pdf, Nov. 21, 2017, 20 pages.
International Preliminary Report on Patentability for International Patent Application No. PCT/US2018/054558, dated Apr. 8, 2020, 5 pages.
International Search Report and Written Opinion for International Application No. PCT/GB2022/050681, mailed Jun. 20, 2022, 14 pages.
International Search Report and Written Opinion for International Patent Application No. PCT/GB2019/050199, mailed Mar. 29, 2019, 15 pages.
International Search Report and Written Opinion for International Patent Application No. PCT/GB2019/052222, mailed Nov. 12, 2019, 17 pages.
International Search Report and Written Opinion for International Patent Application No. PCT/GB2020/050188, mailed Mar. 31, 2020, 12 pages.
International Search Report and Written Opinion for International Patent Application No. PCT/IB2019/050642, mailed Apr. 12, 2019, 17 pages.
International Search Report and Written Opinion for International Patent Application No. PCT/IB2019/051629, mailed Jun. 17, 2019, 14 pages.
International Search Report and Written Opinion for International Patent Application No. PCT/US2018/054558, mailed Dec. 10, 2018, 6 pages.
Ioffe and Szegedy, "Batch Normalization: Accelerating Deep Network Training by Reducing Internal Covariate Shift." [Online] Retrieved from the Internet https://arxiv.org/pdf/1502.03167v3.pdf, Submitted on Feb. 11, 2015 (v1), last revised Mar. 2, 2015 (this version, v3), 11 pages.
Kang, et al., "Malware Classification Method via Binary Content Comparison", RACS'12, Oct. 23-26, 2012, San Antonio, TX, USA (2012); 6 pages, https://dl.acm.org/doi/pdf/10.1145/2401603.2401672.
Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.
Kim, Hae-Jung, "Image-Based Malware Classification Using Convolutional Neural Network", In: Park J., Loia V., Yi G., Sung Y. (eds) Advances in Computer Science and Ubiquitous Computing. Lecture Notes in Electrical Engineering (2018); vol. 474, pp. 1352-1357.
Kirkpatrick, J. et al., "Overcoming catastrophic forgetting in neural networks," PNAS (2017); 114 (13): 3521-3526.
Liao and Carneiro, "On the Importance of Normalisation Layers in Deep Learning with Piecewise Linear Activation Units." [Online] Retrieved from the Internet https://arxiv.org/pdf/1508.00330.pdf, Submitted on Aug. 3, 2015 (v1), last revised Nov. 1, 2015 (this version, v2)), 7 pages.
Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf, Oct. 19, 2016, 21 pages.
Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.
Lundberg, S. M. et al., "A Unified Approach to Interpreting Model Predictions," 31st Conference on Neural Information Processing Systems (NIPS 2017), Long Beach, CA, USA, 10 pages.
Montavon, G. et al., "Methods for Interpreting and Understanding Deep Neural Networks," [Online], Retrieved from the Internet: URL: https://arxiv.org/pdf/1706.07979.pdf, Jun. 24, 2017, 14 pages.
Narayanan, et al., "A multi-view context-aware approach to Android malware detection and malicious code localization." Empir Software Eng (2018); 23: 1222-1274. Epub Aug. 30, 2017.
Notice of Allowance for U.S. Appl. No. 17/314,625, dated Mar. 7, 2023, 10 pages.
Pascanu, R. et al., "Revisiting natural gradient for deep networks," [Online], Retrieved from the Internet: URL: https:/arxiv.org/pdf/1301.3584v7.pdf, Feb. 17, 2014, 18 pages.
Pennington and Worah, et al., "The Spectrum of the Fisher Information Matrix of a Single-Hidden-Layer Neural Network", 32nd Conference on Neural Information Processing Systems (NeurIPS 2018), Montreal, Canada, pp. 1-16.

(56) References Cited

OTHER PUBLICATIONS

Ribeiro, M. T. et al., "Model-Agnostic Interpretability of Machine Learning," [Online], Retrieved from the Internet: URL: https://arxiv.org/pdf/1606.05386.pdf, Jun. 16, 2016, 5 pages.

Ribeiro, M. T., "LIME—Local Interpretable Model-Agnostic Explanations," [Online Blog], Retrieved from the Internet: URL: https://homes.cs.washington.edu/~marcotcr/blog/lime/, Apr. 2, 2016, 7 pages.

Ribeiro, M. T. et al., "Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Rudd, E.R., et al., "MOON: A Mixed Objective Optimization Network for the Recognition of Facial Attributes." [Online], Retrieved from the Internet: URL:https://arxiv.org/abs/1603.07027, arXiv:1603.07027 [cs.CV], Mar. 22, 2016, 17 pages.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Salimans, T. et al., "Weight Normalization: A Simple Reparameterization to Accelerate Training of Deep Neural Networks," [Online], Retrieved from the Internet: URL: https://arxiv.org/pdf/1602.07868.pdf, Jun. 4, 2016, 11 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefónica Digital Cyber Security Unit, Madrid, Spain. [Online], Retrieved from the Internet on Nov. 19, 2018: http://www.scitepress.org/Papers/2017/61322, 8 pages.

Saxe, J. et al., "Deep Neural Network Based Malware Detection Using Two Dimensional Binary Program Features", IEEE 2015,10th International Conference on Malicious and Unwanted Software: "Know Your Enemy" (MALWARE) (2015); pp. 11-20.

Saxe, J. et al., "expose: A Character-Level Convolutional Neural Network with Embeddings For Detecting Malicious URLs, File Paths and Registry Keys" arXiv:1702.08568v1 [cs.CR] [Online] https://arxiv.org/abs/1702.08568 (Feb. 27, 2017); 18 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Shah, S., et al., "Virus Detection using Artificial Neural Networks; International Journal of Computer Applications", International Journal of Computer Applications (0975-8887) (Dec. 2013); vol. 84, No. 5, pp. 17-23.

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

Tahan, G., et al., "Mal:ID: Automatic Malware Detection Using Common Segment Analysis and Meta-Features." Journal of Machine Learning 13 (2012); (Submitted Aug. 2011; Revised Nov. 2011, Published Apr. 2012); pp. 949-979, https://www.jmlr.org/papers/volume13/tahan12a/tahan12a.pdf.

Theis, L. et al., "Faster gaze prediction with dense networks and Fisher pruning," [Online], Retrieved from the Internet: URL: https://arxiv.org/pdf/1801.05787.pdf, Jan. 17, 2018, 10 pages.

Tian, et al., "An automated classification system based on the strings of trojan and virus families." Malicious and Unwanted Software (MALWARE); 2009 4th International Conference, Piscataway, NJ, USA, Oct. 13, 2009, pp. 23-30, 8 pages.

Tolomei, G. et al., "Interpretable Predictions of Tree-based Ensembles via Actionable Feature Tweaking," [Online], Retrieved from the Internet: URL: https://arxiv.org/pdf/1706.06691.pdf, Jun. 20, 2017, 10 pages.

Tseng, Huihsin et al., U.S. Appl. No. 62/483,102, filed Apr. 7, 2017, 19 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

Tu, M., et al., "Reducing the Model Order of Deep Neural Networks Using Information Theory", IEEE Computer Society (2016); 2016 IEEE Computer Society Annual Symposium on VLSI, pp. 93-98.

U.S. Appl. No. 15/727,035, Office Action mailed Aug. 14, 2019, 11 pages.

U.S. Appl. No. 15/907,807, Notice of Allowance mailed Oct. 20, 2021, 5 pages.

U.S. Appl. No. 15/884,542, Advisory Action mailed Dec. 6, 2022, 3 pages.

U.S. Appl. No. 15/727,035, Notice of Allowance mailed Dec. 27, 2019, 7 pages.

U.S. Appl. No. 15/884,542, Office Action mailed Apr. 5, 2022, 32 pages.

U.S. Appl. No. 15/884,542, Office Action mailed Jan. 26, 2023, 32 pages.

U.S. Appl. No. 15/884,542, Office Action mailed Mar. 4, 2021, 53 pages.

U.S. Appl. No. 15/884,542, Office Action mailed Sep. 21, 2022, 32 pages.

U.S. Appl. No. 15/884,542, Office Action mailed Sep. 9, 2021, 44 pages.

U.S. Appl. No. 15/907,807, Office Action mailed Apr. 27, 2021, 18 pages.

U.S. Appl. No. 16/158,844, Office Action mailed May 24, 2022, 25 pages.

U.S. Appl. No. 16/257,749, Notice of Allowance mailed Mar. 1, 2021, 10 pages.

U.S. Appl. No. 16/257,749, Office Action mailed Aug. 11, 2020, 14 pages.

U.S. Appl. No. 16/263,264, Corrected Notice of Allowability mailed Jan. 5, 2023, 2 pages.

U.S. Appl. No. 16/263,264, Notice of Allowance mailed Oct. 4, 2022, 9 pages.

U.S. Appl. No. 16/263,264, Office Action mailed Feb. 22, 2022, 13 pages.

U.S. Appl. No. 16/853,803, Notice of Allowance mailed Nov. 30, 2022, 7 pages.

U.S. Appl. No. 16/853,803, Office Action mailed May 2, 2022, 9 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Wu, et al., "L1-Norm Batch Normalization for Efficient Training of Deep Neural Networks." [Online] Retrieved from the Internet https://arxiv.org/pdf/1802.09769.pdf, Submitted on Feb. 27, 2018, 8 pages.

Xu, K., et al., "DeepRefiner: Multi-layer Android Malware Detection System Applying Deep Neural Networks," IEEE European Symposium on Security and Privacy, 2018, 15 pages.

Buitinck, L., et al., "API design for machine learning software: experiences from the scikit-learn project", arXiv preprint (2013); 16 pages.

Dai, J., et al., "Efficient Virus Detection Using Dynamic Instruction Sequences", Journal of Computers (May 2009); 4(5): 405-414.

(56) References Cited

OTHER PUBLICATIONS

Devi, D., et al., "Detection of packed malware", SecurIT'12 (Aug. 17-19, 2012); p. 22.
Elovici, Y., et al., "Applying machine learning techniques for detection of malicious code in network traffic", KI 2007: Advances in Artificial Intelligence: 30th Annual German Conference on AI, KI 2007, Osnabrück, Germany (Sep. 10-13, 2007); Proceedings 30, Springer Berlin Heidelberg (2007); 44-50.
Henchiri, O., et al., "A feature selection and evaluation scheme for computer virus detection", Proceedings of the Sixth International Conference on Data Mining (ICDM'06), IEEE Computer Society (2006); 5 pages.
Joachims, T., "Making large-scale SVM learning practical LS-8 Report 24", Technical Report, University of Dortmund (1998); 18 pages.
Kecman, V., "Support vector machines—an introduction", StudFuzz, Springer-Verlag Berlin Heidelberg (2005); 177: 1-11.
Kolter, J. Z., et al., "Learning to detect and classify malicious executables in the wild", Journal of Machine Learning Research (2006); 7(12): 2721-2744.
Kolter, J. Z., et al., "Learning to detect malicious executables in the wild", Proceedings of the Tenth ACM SIGKDD International Conference on Knowledge Discovery and Data Mining (2004); 9 pages.
Menahem, E., et al., "Improving malware detection by applying multi-inducer ensemble", Computational Statistics & Data Analysis (2009); 53: 1483-1494.
Monnappa, K. A., "Introduction to Malware Analysis", Learning Malware Analysis: Explore the concepts, tools, and techniques to analyze and investigate Windows malware, Packt Publishing Ltd., Birmingham—Mumbai (2018); Chapter 1: pp. 7-10; Chapter 9: p. 362; 9 pages.
Mukkamala, S., et al., "Intrusion detection using an ensemble of intelligent paradigms", Journal of Network and Computer Applications (2005); 28(2): 167-182.
Russell, S. J., "Kernel Machines", Artificial Intelligence A Modern Approach, Pearson Education International (2010); Section 20(6): 749-751.
Sikorski, M., et al., "Practical malware analysis: the hands-on guide to dissecting malicious software", No. starch press (2012); pp. 2-3; pp. 11-13; p. 384; 12 pages.
Souppaya, M., et al., "Guide to malware incident prevention and handling for desktops and laptops", NIST Special Publication 800-83 Revision 1 (2013); 47 pages.
Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.
U.S. Appl. No. 16/158,844, Advisory Action mailed Jun. 6, 2023, 3 pages.
Wang, T., et al., "Detecting unknown malicious executables using portable executable headers", 2009 Fifth International Joint Conference on INC, IMS and IDC. IEEE (2009); 1 page.
Wilding, Ed., "The authoritative international publication on computer virus prevention, recognition and removal", Virus Bulletin (Nov. 1990); 24 pages.
Ye, Y., et al., "SBMDS: an interpretable string based malware detection system using SVM ensemble with bagging", Journal in Computer Virology (2009); 5: 283-293.
Ye, Y., et al., "Hierarchical associative classifier (HAC) for malware detection from the large and imbalanced gray list", Journal of Intelligent Information Systems (2010); 35: 1-20.
Corrected Notice of Allowability for U.S. Appl. No. 17/314,625 mailed Oct. 24, 2023, 5 pages.
Huang, Y., et al., "Graph neural networks and cross-protocol analysis for detecting malicious IP addresses", Complex & Intelligent Systems (2023); 9(4): 3857-3869, Published Online Sep. 14, 2022.
International Preliminary Report on Patentability for International Application No. PCT/GB2022/050681, mailed Nov. 2, 2023, 7 pages.
Notice of Allowance for U.S. Appl. No. 16/158,844 mailed Nov. 1, 2023, 11 pages.
Notice of Allowance for U.S. Appl. No. 17/239,128 dated Jan. 26, 2024, 19 pages.
Restriction Requirement for U.S. Appl. No. 17/168,913 mailed Jun. 24, 2024, 8 pages.

\* cited by examiner

METHODS AND APPARATUS FOR USING MACHINE LEARNING ON MULTIPLE FILE FRAGMENTS TO IDENTIFY MALWARE

CROSS-REFERENCE TO RELATED APPLICATIONS

This application is a continuation of U.S. application Ser. No. 16/853,803, filed Apr. 21, 2020, entitled "Methods and Apparatus for Using Machine Learning on Multiple File Fragments to Identify Malware", now U.S. Pat. No. 11,609,991, which is a continuation of U.S. application Ser. No. 15/727,035, filed Oct. 6, 2017, entitled "Methods and Apparatus for Using Machine Learning on Multiple File Fragments to Identify Malware", now U.S. Pat. No. 10,635,813, the disclosure of each of which is hereby incorporated by reference in its entirety.

BACKGROUND

The embodiments described herein relate to methods and apparatus for using machine learning on multiple file fragments to identify malware. More particularly, the embodiments described herein relate to devices and methods for dividing a file into multiple fragments and using machine learning to identify malicious chunks used to then identify the file as malicious file.

In some known systems, a malware and/or other malicious file can potentially damage or disable a computer(s) and/or computer system(s). In some instances, the malware and/or other malicious file can cause damage to a computer network system and may even lead to disruption of services (for example, distributed denial-of-service (DoS)). Thus, a malware attack can affect the devices connected to the computer network system. Some other types of malware can include program code designed to illegally gather users' personal and/or financial credentials, monitor users' web browsing, display unsolicited advertisements, redirect affiliate marketing revenues and/or the like. Furthermore, recovering a computer network system affected from a malware attack can be difficult and resource-intensive.

Some known devices and methods for malware detection include identifying a malware threat (for example, analyzing a file and/or comparing the file with known malware threats). Malware, however, can be hidden as a small portion of an otherwise benign file (for example, a fragment of a file). In such cases, during the analysis, the file can appear benign and may even pass the malware detection. The hidden malware, however, may eventually affect the computer network system.

Thus, a need exists for improved devices and methods for identifying malware within a portion of a file.

SUMMARY

In some embodiments, a method includes processing at least a portion of a received file into a first set of fragments and analyzing each fragment from the first set of fragments using a machine learning model to identify within each fragment first information potentially relevant to whether the file is malicious. The method includes forming a second set of fragments by combining adjacent fragments from the first set of fragments and analyzing each fragment from the second set of fragments using the machine learning model to identify second information potentially relevant to whether the file is malicious. The method includes identifying the file as malicious based on the first information within at least one fragment from the first set of fragments and the second information within at least one fragment from the second set of fragments. The method includes performing a remedial action based on identifying the file as malicious.

DETAILED DESCRIPTION

Figure 1:
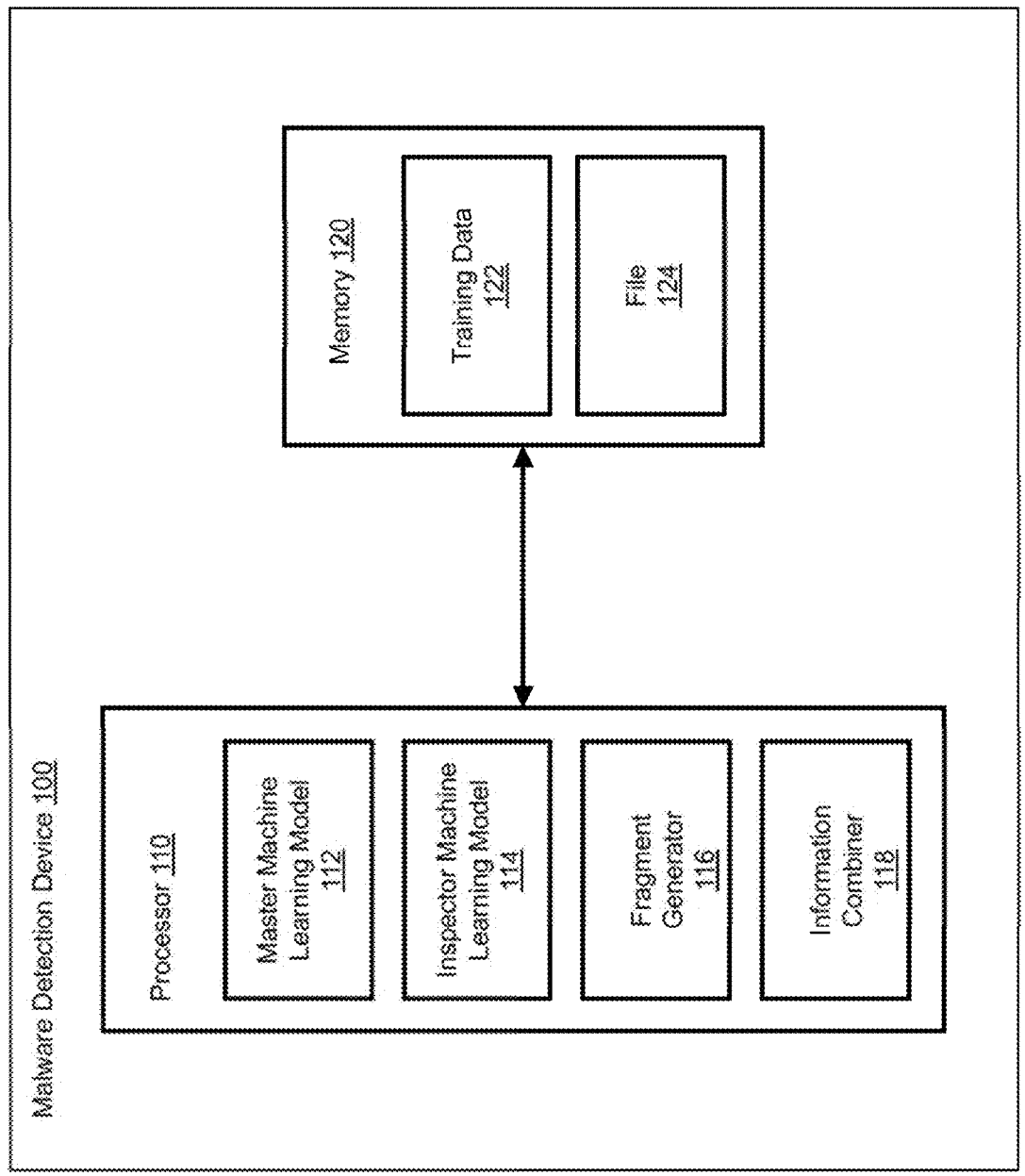
FIG. 1 is a schematic block diagram of a malware detection device, according to an embodiment.

In some embodiments, an apparatus includes a memory and a processor of a malware detection device. The processor is operatively coupled to the memory. The processor can be configured to receive a file and process at least a portion of the file into a first set of fragments. The processor can be configured to analyze each fragment from the first set of fragments using a first machine learning model to identify within each fragment from the first set of fragments first information potentially relevant to whether the file is malicious and to define a set of first information including the first information from each fragment from the first set of fragments. The processor can be configured to select, from the set of first information, the first information most relevant to whether the file is malicious. The processor can be configured to process at least the portion of the file into a second set of fragments. A number of fragments in the second set of fragments is less than a number of fragments in the first set of fragments. The processor can be configured to analyze each fragment from the second set of fragments using the first machine learning model to identify within each fragment from the second set of fragments second information potentially relevant to whether the file is malicious and to define a set of second information including the second information from each fragment from the second set of fragments. The processor can be configured to select, from the set of second information, the second information most relevant to whether the file is malicious. The processor can be configured to identify the file as malicious by analyzing, using a second machine learning model, the first information most relevant to whether the file is malicious and the second information most relevant to whether the file is malicious. The processor can be further configured to quarantine the file based on identifying the file as malicious.

In some embodiments, a method includes receiving a file at a processor of a malware detection device. The method can include processing at least a portion of the file into a first set of fragments. The method can include analyzing each fragment from the first set of fragments using a machine learning model to identify within each fragment from the first set of fragments first information potentially relevant to whether the file is malicious. The method can include combining a first fragment from the first set of fragments with a second fragment from the first set of fragments to define a first combined fragment from a second set of fragments. The method can further include combining a third fragment from the first set of fragments with a fourth fragment from the first set of fragments to define a second combined fragment from the second set of fragments. The method includes analyzing each fragment from the second set of fragments using the machine learning model to identify within each fragment from the second set of fragments second information potentially relevant to whether the file is malicious. The method includes identifying the file as malicious based on the first information within at least one fragment from the first set of fragments and the second information within at least one fragment from the second set of fragments. The method includes performing a remedial action based on identifying the file as malicious.

In other embodiments, a non-transitory processor-readable medium stores code representing instructions to be executed by a processor. The code includes code to cause the processor to receive a file and process at least a portion of the file into a first set of fragments. Each fragment from the first set of fragments includes an ordered sequence of bits from the file. The code further includes code to cause the processor to analyze each fragment from the first set of fragments using a machine learning model to identify first information within that fragment that is most relevant to whether the file is malicious. The code includes code to cause the processor to process at least the portion of the file into a second set of fragments. Each fragment from the second set of fragments includes a greater number of bits from the file than a number of bits from the file within each fragment from the first set of fragments. The code includes code to cause the processor to analyze each fragment from the second set of fragments using the machine learning model to identify second information within that fragment that is most relevant to whether the file is malicious. The code includes code to cause the processor to identify the file as malicious based on the first information within at least one fragment from the first set of fragments and the second information within at least one fragment from the second set of fragments. The code further includes code to cause the processor to perform a remedial action based on identifying the file as malicious.

FIG. 1 is a schematic block diagram of a malware detection device 100, according to an embodiment. The malware detection device 100 can be a hardware based computing device and/or a multimedia device, for example, a server, a smartphone, a tablet, a laptop and/or the like. The malware detection device 100 includes a processor 110 and a memory 120. The memory 120 can store a computer file(s), an instruction(s), a program code(s), a datum(data) and/or the like. The processor 110 can be configured to execute instructions stored in the memory 120. In some instances, the malware detection device 100 can be connected to a communication network (not shown in FIG. 1), for example, the Internet, an intranet, a local area network (LAN), a wide area network (WAN), a metropolitan area network (MAN), a worldwide interoperability for microwave access network (WiMAX®), an optical fiber (or fiber optic)-based network, a virtual network, and/or any combination thereof. The malware detection device 100 can be configured to receive a file (e.g., file 124 described herein) from the communication network and store the received file in the memory 120. The received file can be processed by the processor 110 as described in detail herein.

The memory 120 can be a hardware based integrated circuit (IC). The memory 120 in the malware detection device 100 can be, for example, a random access memory (RAM), a memory buffer, a hard drive, a read-only memory (ROM), an erasable programmable read-only memory (EPROM), and/or the like. In some implementations, the memory 120 can be a portable memory (for example, a flash drive, a portable hard disk, and/or the like) that can be operatively coupled to the processor 110. The memory 120 can store, for example, one or more software modules and/or code that can include instructions to cause the processor 110 to perform one or more processes, functions, and/or the like. The memory 120 can be used to store a set of fragments generated by the fragment generator 116, a set of information generated by the inspector machine 114, an output generated by the master machine learning model 112 and/or any other type of data. The memory 120 can store a file 124 and training data 122.

The file 124 can include a document, a spreadsheet, a presentation, a text file and/or the like. For example, the file can be at least one of a Hypertext Markup Language (HTML) file(s), a JavaScript file(s), or a Hypertext Preprocessor (PHP) file(s), and/or the like. The file 124 can include a software code, a webpage(s), a data file(s), a model file(s), a source file(s), a script(s), a process(es), a binary executable file(s), a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), a network address (e.g., a Media Control (MAC) address, Internet Protocol (IP) address, etc.) of a compute device, and/or the like. In some instances, the file 124 is analyzed by the processor 110 of the malware detection device 100 to identify whether the file is malicious, as described in further detail herein.

The training data 122 can be stored in the memory 120. The training data can include multiple sets of data and each set of data can contain at least one pair of an input file and an associated desired output value. The training data 122 can include input files as both malicious files and benign files. The training data 122 can be used to train the master machine learning model 112. The training data 122 can for example include a set of files used for learning that is to fit the parameters (for example, weights of the neurons in a neural network) of the classifier used in the master machine learning model. The training of the master machine learning model 112 is later described in detail.

In some instances, the training data 122 can be modified and/or updated by the processor 110. The modification and/or update may be implemented after the inspector machine learning model 114 identifies a new set of information associated with a new type of malware within the set of fragments. The inspector machine learning model 114 can send the identified new set of information associated with the new type of malware to the master machine learning model 112. Furthermore, modification and/or update may be implemented by the master machine learning model when the master machine learning model 112 convicts a suspected malicious fragment within the set of fragments.

The processor 110 can be, for example, a hardware based integrated circuit (IC) or any other suitable processing device configured to run and/or execute a set of instructions or code. For example, the processor 110 can be a general purpose processor, a central processing model (CPU), an accelerated processing model (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a fragment generator 116, an inspector machine learning model 114, an information combiner 118 and a master machine learning model 112. The fragment generator 116 can be a program and/or software code stored in the memory 120 and executed by the processor 110. In other instances, the fragment generator can be a dedicated hardware-based IC. In such other instances, the hardware-based fragment generator can be implemented using for example, an ASIC, a CPLD, an FPGA and/or the like.

The fragment generator 116 can be configured to retrieve (and/or load) a file 124 stored in the memory 120. The fragment generator 116 can be configured to generate a set of fragments of the retrieved file. The fragment generator 116 can then store the set of fragments in the memory 120. For example, the fragment generator 116 retrieves a file stored in the memory 120. The fragment generator 116 then divides the retrieved file into multiple ordered sequences of bits. Each ordered sequence of bits forms a fragment of the file and the fragmented file can include multiple fragments forming a set of fragments. The fragment generator 116 stores the set of fragments in the memory 120.

In some instances, the fragment generator 116 can be configured to generate a set of fragments with each fragment from the set of fragments having a same or different size of the remaining fragments from the set of fragments. Furthermore, the size of each fragment from the set of fragments can depend on different factors such as a file size, a file type, a file source and/or other like. In other instances, the fragment generator 116 can be configured to generate a fixed number of fragments for the file. In other words, a set of fragments includes a fixed number of fragments. Accordingly, in such instances the size of each fragment is based on the overall size of the file. Thus, in such instances, for a large-sized file, the fragment generator 116 generates a set of fragments with each fragment having a large size (e.g., a large number of bits). Similarly, in such instances, for a small-sized file, the fragment generator 116 generate a set of fragments with each fragment having a small size (e.g., a small number of bits). For example, the fragment generator 116 can be configured to generate a set of 16 fragments. In such an example, for a file having a size of 1024 Bytes, the fragment generator 116 will generate a set of fragments including 16 fragments, each having a size of 64 Bytes. Similarly, for a file having a size of 2048 Bytes, the fragment generator 116 will generate a set of fragments including 16 fragments, each having a size of 128 Bytes.

In yet another instance, the fragment generator 116 can be configured to divide a file into a set of fragments having different, variable and/or a variety of sizes. For example, a file of 1024 Bytes can be fragmented into 4 fragments including fragment sizes 128 Bytes, 256 Bytes, 320 Bytes and 320 Bytes.

In some instances, the fragment generator 116 can be configured to generate multiple sets of fragments for the file. Each set of fragments within the multiple sets of fragments can include fragments of equal size. For example, the fragment generator can be configured to generate four sets of fragments for a file having a size of 1024 bytes. The file can be fragmented into a first set containing 32 fragments each including 32 bytes of the file, a second set containing 16 fragments each including 64 bytes of the file, a third set containing 8 fragments each including 128 bytes of the file, and a fourth set containing 4 fragments each including 256 bytes of the file.

In other instances, the fragment generator 116 can be configured to generate a first set of fragments for the file by fragmenting (or dividing) the file into multiple fragments. The fragment generator can be further configured to generate a second set of fragments by coalescing (or combining) fragments from the first set of fragments. For example, the fragment generator 116 can be configured to generate two sets of fragments for a file having a size of 1024 bytes stored in the memory 120. The fragment generator 116 can be configured to fragment the file into a first set containing 32 fragments each including 32 bytes of the file. The first set of fragments can be generated by dividing the file into 32 fragments. The fragment generator 116 can then be configured to generate a second set of fragments containing 16 fragments each including 64 bytes of the file. Each fragment from the second set of fragments is generated by coalescing (or combining) two adjacent fragments from the first set of fragments. The fragment generator 116 then stores the first and the second set of fragments in the memory 120.

In other instances, the fragment generator 116 can be configured to generate a third set of fragments based on the second set of fragments. For example, the fragment generator 116 can define each fragment from the third set of fragments by coalescing (or combining) two adjacent fragments from the second set of fragments. Similarly a fourth set of fragments can be defined based on the third set of fragments, and so on.

In other instances, the fragment generator can be configured to generate multiple sets of fragments and store the multiple sets of fragments in the memory 120. The fragment generator 116 can be configured to store a set of fragments substantially immediately after that set of fragment's generation. In another instance, the fragment generator 116 can store multiple sets of fragments after the multiple sets are generated.

The inspector machine learning model 114 can be a software-based machine learning model executed by the processor 110. The inspector machine learning model 114 can be stored in the memory 120 (e.g., code to cause the processor 110 to execute the inspector machine learning model 114 can be stored in the memory 120). The inspector machine learning model 114 can be any suitable type of machine learning model such as, for example, a neural network, a decision tree model, a random forest model, a deep neural network and/or the like. In other instances, the inspector machine learning model can be a dedicated hardware-based IC. Such a hardware-based inspector machine learning model 112 can be implemented using an ASIC, a FPGA, a CPLD, a PLA, a PLC and/or the like.

The inspector machine learning model 114 can be configured to retrieve multiple sets of fragments from the memory 120 (e.g., generated by the fragment generator 116). The inspector machine learning model 114 can be configured to analyze one or more sets of fragments to determine and/or identify information that would be useful in a malicious determination (e.g., information that is potentially relevant to determining whether the file is malicious). Based on the analysis, the inspector machine learning model 114 can be configured to generate a set of information. The set of information includes information that would be useful in a malicious determination. The inspector machine learning model 114 can be configured to store the set of information in the memory 120.

For example, the inspector machine learning model 114 can implement neuron based classifiers in a neural network. The neurons in the neural network can be weighted to analyze the fragments from the set of fragments to determine and/or identify information that would be useful in a malicious determination (e.g., to identify information in a fragment that is potentially relevant to determining whether the file is malicious).

In some instances, the inspector machine learning model 114 can be configured to retrieve and analyze the multiple sets of fragments. The inspector machine learning model 114 can be configured to generate multiple sets of information and store the multiple sets of information in the memory 120.

For example, if the fragment generator 116 fragments a file into 4 sets of fragments and stores the 4 sets of fragments in the memory 120. The inspector machine learning model 114 can be configured to retrieve the 4 sets of fragments from the memory 120. For example, the inspector machine learning model 114 retrieves and analyzes a first set of fragments. The inspector machine learning model 114 then generates a first set of information including information from each fragment from the first set of fragments. Similar to the first set of fragments, the inspector machine learning model 114 retrieves and analyzes a second set of fragments, a third set of fragments and a fourth set of fragments and the inspector machine learning model 114 generates a second set of information, a third set of information and a fourth set of information, respectively. The inspector machine learning model 114 can be configured to store the first set of information, the second set of information, the third set of information and the fourth set of information in the memory 120.

The information combiner 118 can be a program and/or software code executed by the processor 110. The information combiner 118 can be stored in the memory 120 (e.g., code to cause the processor 110 to execute the information combiner 118 can be stored in the memory 120). In other instances, the information combiner can be a dedicated hardware-based IC. In such other instances, the hardware-based information combiner can be implemented using for example, an ASIC, a CPLD, a FPGA, a PLA, a PLC and/or the like.

The information combiner 118 can be configured to retrieve a set of information stored in the memory 120 (e.g., generated by the inspector machine learning model 114). The information combiner 118 can be configured to select from the set of information, a portion of information associated with a fragment of a file. The selected portion of information may disclose information indicating to whether the fragment of the file is malicious. Furthermore, the selected portion of information can disclose information helpful to determine whether the file is malicious (e.g., information that is potentially relevant to determining whether the file is malicious). In some instances, the information combiner 118 can select each portion of information that the information combiner 118 (or the inspector machine learning model 114) believes is most relevant to determining whether the file is malicious. In other instances, the information combiner 118 can be configured to retrieve the multiple sets of information.

The information combiner 118 retrieves the first set of information and selects a first portion of information. Similarly, the information combiner 118 retrieves the second set of information and selects a second portion of information, retrieves the third set of information and selects a third portion of information and so on. Thus, the information combiner 118 can be configured to select a portion of information from each set of information from the multiple sets of information. The information combiner 118 is then configured to generate a set of combined information that includes the multiple selected portions of information from the multiple sets of information. The information combiner 118 can be configured to store the set of combined information in the memory.

In some instances, the set of information can include multiple information representing different levels of maliciousness (for example, low-level malicious, medium-level malicious, high-level malicious, extreme-level malicious and/or the like) In some instances, the inspector machine learning model 114 can set level definitions for identifying information indicated by a fragment (for example, a definition for identifying a low-level maliciousness information indicated by a fragment, a definition for identifying a medium-level maliciousness information indicated by a fragment, a definition for identifying a high-level maliciousness information indicated by a fragment and/or the like). Thus, the level definitions can help the inspector machine learning model 114 to categorize the analyzed fragment based on the level of malicious information indicated by the analyzed fragment from the set of fragments. The information combiner 118 can be configured to select the portion of information from among the set of information based on the level of maliciousness represented. In some instances, the information combiner 118 can be configured to implement a max pooling process for selecting and combining a portion of information associated with potentially malicious fragment from the set of information. In some instances, the information combiner 118 can set different and/or same level definitions as compared with the level definition of inspector machine learning model.

The master machine learning model 112 can be a software-based machine learning model executed by the processor 110. The master machine learning model 112 can be stored in the memory 120 (e.g., code to cause the processor 110 to execute the master machine learning model 112 can be stored in the memory 120). The master machine learning model 112 can be any suitable type of machine learning model such as, for example, a neural network, a decision tree model, a random forest model, a deep neural network and/or the like. In other instances, the master machine learning model can be a dedicated hardware-based IC. Such a hardware-based master machine learning model 112 can be implemented using an ASIC, a FPGA, a CPLD, a PLA, a PLC and/or the like.

In some instances, the master machine learning model 112 can have two modes of operations—a training mode and a post-training mode. In some instances, the post-training mode can be considered to be an implementation of the training (and/or learning) acquired during the training mode.

In the training mode, the master machine learning model 112 can function as a differentiable model. The master machine learning model can learn and/or be trained to identify and/or determine whether information associated with a set of fragments provides an indication of whether the file is malicious or not (e.g., identifies information that is potentially relevant to determining whether the file is malicious). The master machine learning model 112 can be trained using training data 122 stored in the memory 120. The training involves the master machine learning model 112 learning how to detect a malicious file (data, directory and/or the like) and/or information that is potentially relevant to determine whether the file is malicious through analysis of multiple sets of fragments of the file (data, directory and/or the like). In some instances, a backpropagation method can be used to train the master machine learning model 112. The training process of the master machine learning model 112 is further described in detail herein.

In the post-training mode, the master machine learning model 112 functions as a binary classifier. Specifically, the master machine learning model 112 generates a binary output indicating whether the information related to the set of fragments is malicious or not. The master machine learning model 112 can detect (and/or identify) indicators that suggest when a particular fragment of a file may be malicious, and which indicators are most relevant to which types of viruses, malware, worm files, Trojan horses, spam, self-replicating programs and/or the like.

For example, in the post-training mode, the master machine learning model 112 can be configured to retrieve a set of combined information associated with multiple sets of fragments from the memory 120. In some instances, the set of combined information is stored in the memory 120 by the information combiner 118. The set of combined information can include at least one portion of information associated with a fragment from the set of information. The master machine learning model 112 can be configured to analyze the retrieved set of combined information and determine whether the file is malicious.

In some instances, in the post-training mode, the master machine learning model 112 can be configured to provide feedback to the inspector machine learning model 114 for identifying fragments relevant to determining whether the file is malicious. Based on the feedback, the processor 110 can be configured to adjust one or more weights associated with one or more neurons of the inspector machine learning model 114. For example, the master machine learning model 112 can propagate (and/or impart) information to train the inspector machine learning model 114 using a backpropagation method.

In some instances, the master machine learning model 112 can be configured to impart (and/or propagate) information to train the inspector machine learning model 114 to identify fragments relevant to determining whether the file is malicious. For example, the master machine learning model 112 can train the inspector machine learning model 114 using a backpropagation method. Furthermore, the master machine learning model 112 can reduce training time by sending information to the inspector machine learning model 114 to train the inspector machine learning model 114. In other instances, the inspector machine learning model 114 can be configured to provide feedback to the master machine learning model 112, described in detail herein.

In some instances, the malware detection device can include one master machine learning model and multiple inspector machine learning model. In such instances, the master machine learning model can impart (and/or propagate) information to train multiple inspector machine learning models.

In use, the malware detection device 100 can be configured to receive the file 124 from an external device connected to a communication network (not shown in FIG. 1). The malware detection device 100 can be configured to store the received file 124 in the memory 120. A fragment generator 116 can be configured to retrieve the file 124 from the memory 120 and generate a set of fragments. The fragment generator 116 can be configured to store the set of fragments in the memory 120. The inspector machine learning model 114 can be configured to analyze each fragment in the set of fragments. Based on the analysis, the inspector machine learning 114 can generate a set of information including information that can help in determining whether the file is malicious or not. The inspector machine learning model 114 can be configured to store the set of information in the memory 120.

In some instances, the inspector machine learning model 114 can be configured to analyze multiple sets of fragments of file 124 to generate multiple sets of information associated with each of the analyzed sets of fragments. The inspector machine learning model 114 can be configured to store the multiple sets of information in the memory 120.

The information combiner 118 can be configured to retrieve the multiple sets of information and analyze each set of information. The information combiner can be configured to select a portion of information from each analyzed set of information. The information combiner can be configured to generate a set of combined including selected portions of information from the analyzed multiple sets of information. The selected portion of information can disclose potentially relevant information to whether the file is malicious. Furthermore, the information combiner 118 can be configured to store the set of combined information in the memory 120.

The master machine learning model 112 can be configured to retrieve the said set of combined information from the memory 120 and to analyze the retrieved set of combined information to determine whether the file is malicious. In some instances, the master machine learning model 112 can be configured to function as a binary classifier that is, the master machine learning model 112 generates a binary output indicating whether the file 124 is malicious or not.

As an example, for a file having the size of 1024 Bytes, the fragment generator 116 can be configured to fragment and/or divide the file into four sets of fragments: a first set containing 32 fragments each having 32 bytes, a second set containing 16 fragments each having 64 bytes, a third set containing 8 fragments each having 128 bytes, and a fourth set containing 4 fragments each having 256 bytes. The four sets of fragments can be stored in the memory 120. The inspector machine learning model 114 can be configured to retrieve the four sets of fragments from the memory 120. Further, the inspector machine learning model 114 can be configured to analyze each fragment from each set of fragments from the four sets of fragments. Similarly stated, the inspector machine learning model 114 can be configured to analyze each fragment in the first set, each fragment in the second set, each fragment in the third set and each fragment in the fourth set. Based on the analysis, the inspector machine learning model 114 can identify information that can help in determining whether the file is malicious or not. The inspector machine learning model 114 identifies information associated with each fragment in the first set to generate a first set of information. Similarly, the inspector machine learning model 114 identifies information associated with each fragment in the second set to generate a second set of information, identifies information associated with each fragment in the third set to generate a third set of information, and identifies information associated with each fragment in the fourth set to generate a fourth set of information. Thus, the inspector machine learning model generates four sets of information associated with each of the analyzed sets of fragments and stores the four sets of information in the memory 120.

The information combiner 118 can be configured to retrieve the four sets of information. The information combiner 118 retrieves the first set of information and selects a first portion of information. Similarly, the information combiner retrieves the second set of information and selects a second portion of information, retrieves the third set of information and selects a third portion of information, and retrieves the fourth set of information and selects a fourth portion of information. Thus, the information combiner 118 can be configured to select a portion of information from each set of information from the four sets of information. The information combiner 118 is then configured to generate a set of combined information that includes the four selected portions of information from the four sets of information. The information combiner 118 can be configured to store the set of combined information in the memory 120. The master machine learning model 112 can be configured to retrieve the set of combined information from the memory 120 and to analyze the retrieved set of combined information and determine whether the file is malicious.

Figure 2:
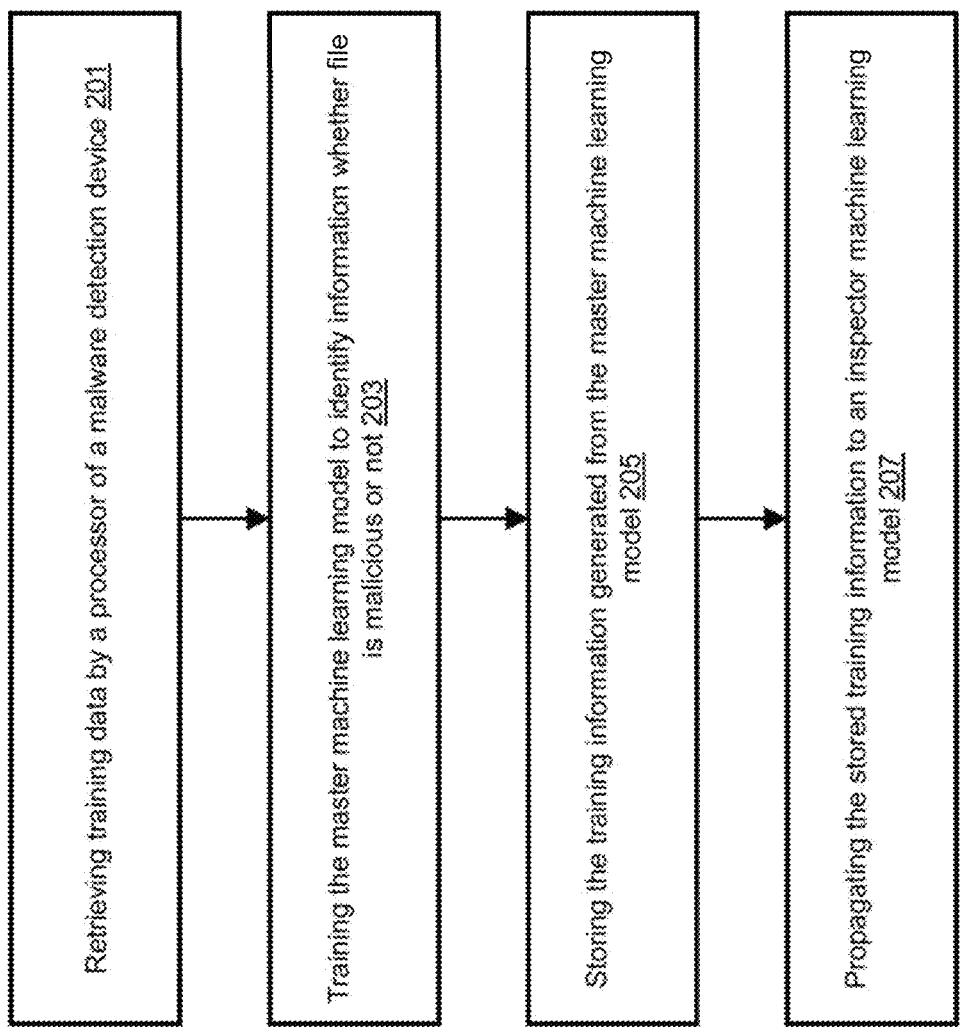
FIG. 2 is a flow chart illustrating a method of training a master machine learning model, according to an embodiment.

FIG. 2 is a flow chart illustrating a method of training a master machine learning model (e.g., similar to master machine learning model 112, shown and described with respect to FIG. 1), according to an embodiment. In some instances, a master machine learning model can be trained, using training data stored in a memory (e.g., training data 122 stored in memory 120, shown and described with respect to FIG. 1), to determine whether a file is malicious or not. The training data can include of a set pair of an input file and an output value. The input file, for example, can include a set of java scripts, a set of iframes, a set of Document Object Model (DOM) elements, a set containing multiple arbitrary sections of a file and/or the like. The output value can include an indicator value. The indicator value can be an indicative information whether the associated input file is malicious or not.

A training process of the master machine learning model can involve modifying parameters of one or more classifiers using the training data. For example, the training data can be used to adjust weights of the neurons in a neural network. The training data can be used to tune the classifier for choosing a number of hidden units in a neural network. As another example, the training data can include a set of examples used for training (e.g., to fit the parameters of the classifier).

At 201, a processor of a malware detection device can be configured to retrieve training data stored in a memory. The retrieved training data can include a set pair of an input file and an output value. For example, the processor 110 (as shown in FIG. 1) can be configured to receive training data 122 stored in the memory 120 (as shown in FIG. 1).

At 203, the master machine learning model is trained to identify information that can be used to determine whether the file is malicious or not. The training process of the master machine learning model can involve modifying parameters of one or more classifiers, for example, adjusting weight values of one or more neurons, modifying bias values of one or more neurons and/or changing values associated with other suitable parameters. For example, the training data can be used to adjust weights of the neurons in a neural network. For another example, the training data can be used to tune the classifier for choosing the number of hidden units in a neural network.

At 205, post-training, the master machine learning model can be configured to store the training information in the memory. For example, the master machine learning model can be configured to store information in the memory such as a weight value of a neuron, a bias value and/or an architecture of the neural network.

At 207, the master machine learning model can be configured to propagate (and/or send) information to the inspector machine learning model (e.g., inspector machine learning model 114 shown and described with respect to FIG. 1). For example, the master machine learning model can be configured to send information such as the weight value and/or the bias value of the classifier to the inspector machine learning model. In some instances, the master machine learning model can be configured to implement a method for learning and propagating in the information to the inspector machine learning model. In some instances, the master machine learning model can be configured to implement a backpropagation method for propagating stored training information to the inspector machine learning model. Furthermore, the inspector machine learning model can be configured to access the training information provided by the master machine learning model. In this manner, the inspector machine learning model can be trained by the master machine learning model.

In some instances, the training data can include a validation set, a test set and/or the like. The validation set can include a set of examples used to tune the parameters of a master machine learning model. A test set can include a set of examples used to assess the performance of a trained master machine learning model.

In some instances, the master machine learning model and the inspector machine learning model can be trained jointly. In such an instance, training data (e.g., training data 122 stored in memory 120, shown and described with respect to FIG. 1) can be provided to the inspector machine learning model. The inspector machine learning model can analyze fragments of the training data to identify information within each fragment from one or more sets of fragments that is indicative of maliciousness (e.g., is useful in determining whether the file is malicious), as described herein. The inspector machine learning model can send the information to the master machine learning model. The master machine learning model can then use the information to determine whether the training data is malicious, as described in further detail herein. This determination can be compared against a predefined output value for the training data that indicates whether the training data is actually malicious.

In the training mode, the master machine learning model can be configured to identify whether errors were made in identifying whether a file is malicious or not based on the information received from the inspector machine learning model and the provided output value. The master machine learning model can be configured to identify a source of an error (e.g., the relied upon information received from the inspector machine learning model that caused the error). Based on the source of the error, the master machine learning model can update data and/or weights associated with the error in an effort to minimize the analyzed error(s). Further, the master machine learning model can be configured to provide feedback and/or updated information to the inspector machine learning model such that inspector machine learning model can minimize the future occurrence of the error(s). Similarly stated, the feedback from the master machine learning model can indicate to the inspector machine learning model the information helpful and not helpful in identifying malware. The master machine learning model can be configured to provide updated information to the inspector machine learning model using backpropagation. In some instances, the updated information can include, for example, a weight value (or an instruction to change a weight value) used by the inspector machine learning model, a bias value (or an instruction to change a bias value) used by the inspector machine learning model, and/or any other suitable value used to provide instruction and/or calibration to the inspector machine learning model regarding what type of information to provide to the master machine learning model. The inspector machine learning model can then use the feedback received from the master machine learning model to further calibrate the information identified by the inspector machine learning model. In such a manner, the inspector machine learning model can be jointly trained with the master machine learning model.

Figure 3A:
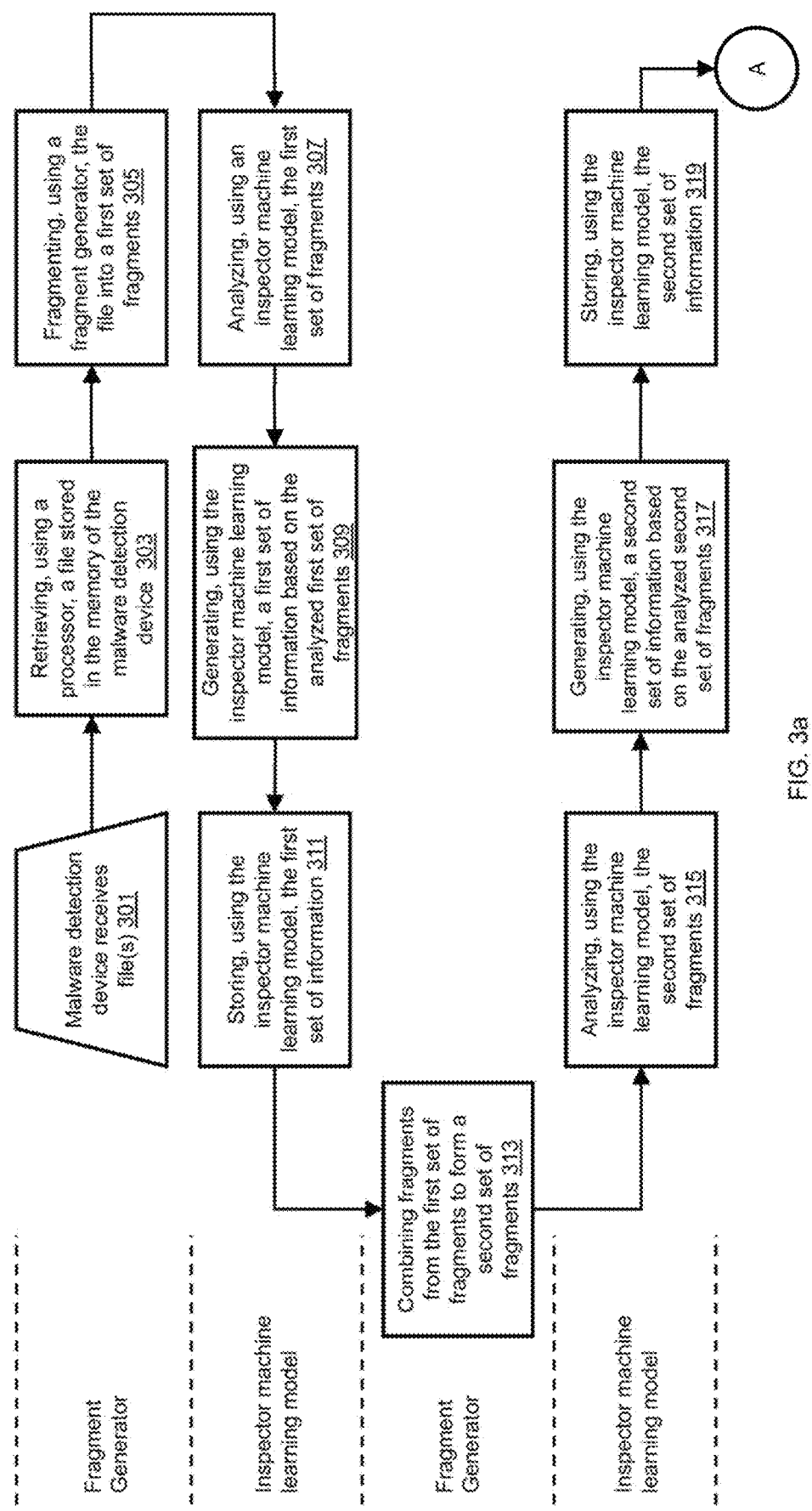
FIGS. 3a and 3b are flow charts illustrating a method of determining whether a file is malicious, according to an embodiment.
Figure 3B:
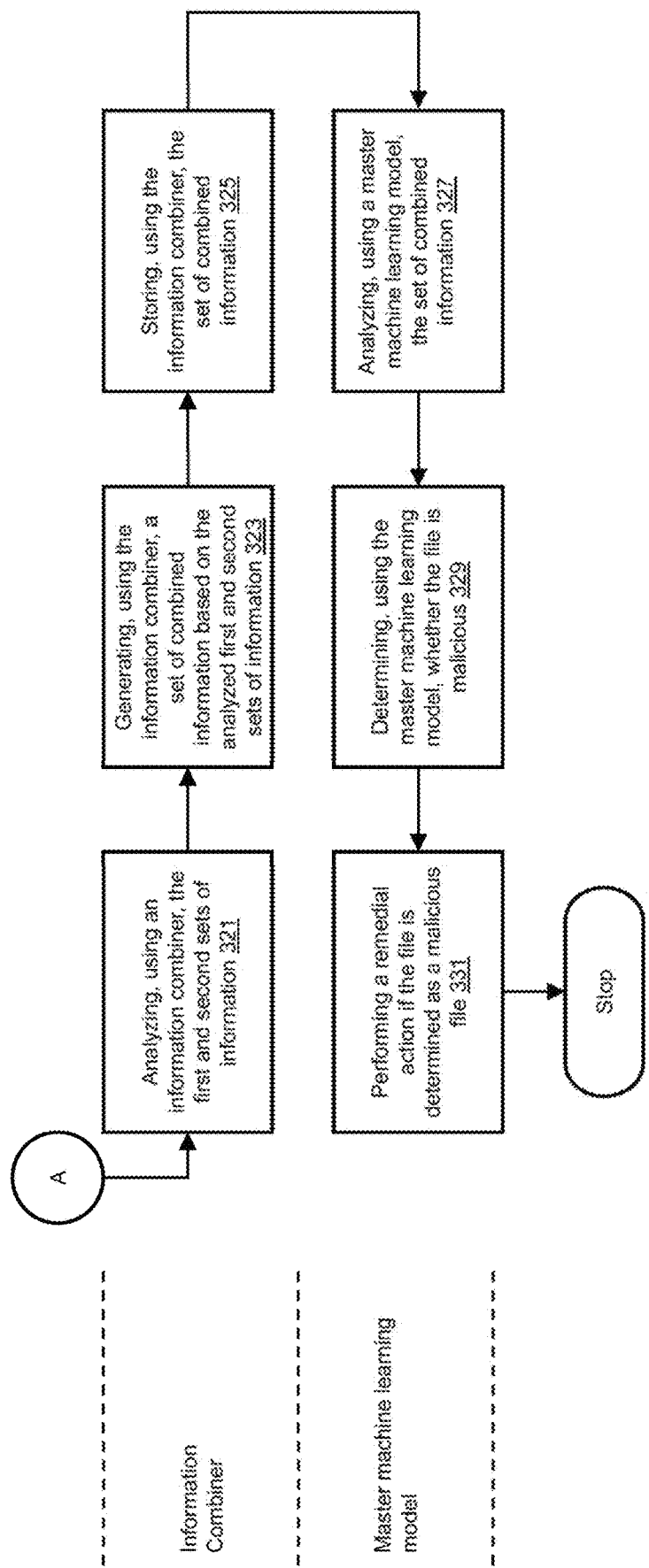

FIGS. 3a and 3b are flow charts illustrating a method of determining whether a file is malicious, according to an embodiment. At 301, a malware detection device can be configured to receive one or more files. The files received by the malware detection device can be transmitted from an external device connected to a communication network (not shown in FIG. 1). The malware detection device can be configured to store the received files in the memory. At 303, the processor can be configured to retrieve a file stored in a memory of the malware detection device. The processor retrieves the file to determine whether the file is malicious or not. At 305, the retrieved file can be fragmented using a fragment generator into a first set of fragments. The fragment generator can be further configured to store the generated first set of fragments in the memory.

The first set of fragments can be retrieved from the memory by an inspector machine learning model. At 307, the inspector machine learning model is configured to perform analysis on the retrieved first set of fragments. The analysis can be performed fragment-by-fragment for the fragments present in the first set of fragments and can identify information within fragments from the first set of fragments that would be useful in determining whether the file is malicious. Using the identified information associated with analyzed fragments from the first set of fragments, at 309, the inspector machine learning model can be configured to generate a first set of information. Thus, the first set of information can include information useful in determining whether the file is malicious and associated with the analyzed fragments from the first set of fragments. At 311, the inspector machine learning model can be configured to store the first set of information in the memory.

The fragment generator can be configured to retrieve the first set of fragments from the memory. At 313, the fragment generator can be configured to generate a second set of fragments by coalescing (or combining) fragments from the first set of fragments. In some instances, each fragment from the second set of fragments is generated by coalescing (or combining) two adjacent fragments from the first set of fragments. The fragment generator can be configured to store the second set of fragments in the memory. In other instances, rather than defining the second set of fragments by combining fragments from the first set of fragments, the fragment generator can divide and/or fragment the file a second time and in a different manner to generate the second set of fragments.

The second set of fragments can be retrieved from the memory by the inspector machine learning model. At 315, the inspector machine learning model is configured to perform analysis on the second set of fragments. The analysis can be performed fragment-by-fragment for the fragments present in the second set of fragments and can identify information within fragments from the first set of fragments that would be useful in determining whether the file is malicious. Using the identified information associated with analyzed fragments from the second set of fragments, at 317, the inspector machine learning model can be configured to generate a second set of information. The second set of information can include information useful in determining whether the file is malicious and associated with the analyzed fragments from the second set of fragments. At 319, the inspector machine learning model can be configured to store the second set of information in the memory.

While not shown in FIG. 3a, in some instances, the fragment generator can be configured to generate a third set of fragments by retrieving the second set of fragments and coalescing (or combining) fragments from the second set of fragments. The fragment generator can be further configured to store the third set of fragments in the memory and the inspector machine learning model can perform analysis on the third set of fragments. Furthermore, in some instances, the fragment generator can be configured to generate a fourth set of fragments by retrieving the third set of fragments and coalescing (or combining) fragments from the third set of fragments. The fragment generator can be configured to store the fourth set of fragments in the memory and the inspector machine learning model can perform analysis on the fourth set of fragments. In yet another instance, the fragment generator can be configured to generate any number of sets of fragments for analysis by the inspector machine learning model.

The information combiner can be configured to retrieve the first set of information and second set of information from the memory. At 321, the information combiner can be configured to analyze the first set of information to select from the first set of information, a portion of information associated with a fragment from the first set of fragments of the file. The selected portion of information can disclose information within that fragment from the first set of fragments that is indicative of maliciousness (e.g., is useful in determining whether the file is malicious). Similarly stated, the selected portion of information can be helpful in determining whether the file is malicious. In some instances, the selected portion of information can be the most relevant information from the first set of information in determining whether the file is malicious. For example, while generating a set of combined information, the information combiner can be configured to select a fragment indicating information as 'high-level' maliciousness as identified by the inspector machine learning model.

Similarly, the information combiner can be configured to analyze the second set of information to select from the set of information, a portion of information associated with a fragment from the second set of fragments of the file. The selected portion of information can disclose information within that fragment from the second set of fragments that is indicative of maliciousness (e.g., is useful in determining whether the file is malicious). Similarly stated, the selected portion of information can be helpful in determining whether the file is malicious. In some instances, the selected portion of information can be the most relevant information from the second set of information in determining whether the file is malicious.

At 323, the information combiner can be configured to generate a set of combined information. The set of combined information can include the selected portion of information from the analyzed first set of information and the analyzed second set of information. At 325, the information combiner can be configured to store the generated set of combined information in the memory.

A master machine learning model is configured to retrieve the set of combined information from the memory. At 327, the master machine learning model can be configured to analyze the set of combined information. For example, the master machine learning model can be configured to analyze a first selected portion of information from the first set of information. The first selected portion of information includes information associated with a fragment from the first set of fragments of the file that is useful in a determination regarding whether the file is malicious. Similarly, the master machine learning model can be configured to analyze a second selected portion of information from the second set of information. The second selected portion of information includes information associated with a fragment from the second set of fragments of the file that is useful in a determination regarding whether the file is malicious. Based on the analysis, at 329, the master machine learning model can be configured to determine whether the file is malicious or not.

In instances, when the file is found to be malicious, at 331, the master machine learning model can perform remedial action. In some instances, remedial actions can include, for example, quarantining the file, deleting the file, notifying an administrator, awaiting further instructions from a user, and/or the like. In other instances, the malware detection device can be configured to share details and/or information about the malicious file to a remote server via a communication network. In yet other instances, the malware detection device can be configured to send the malicious file to a remote server via the communication network for further analysis.

Figure 4A:
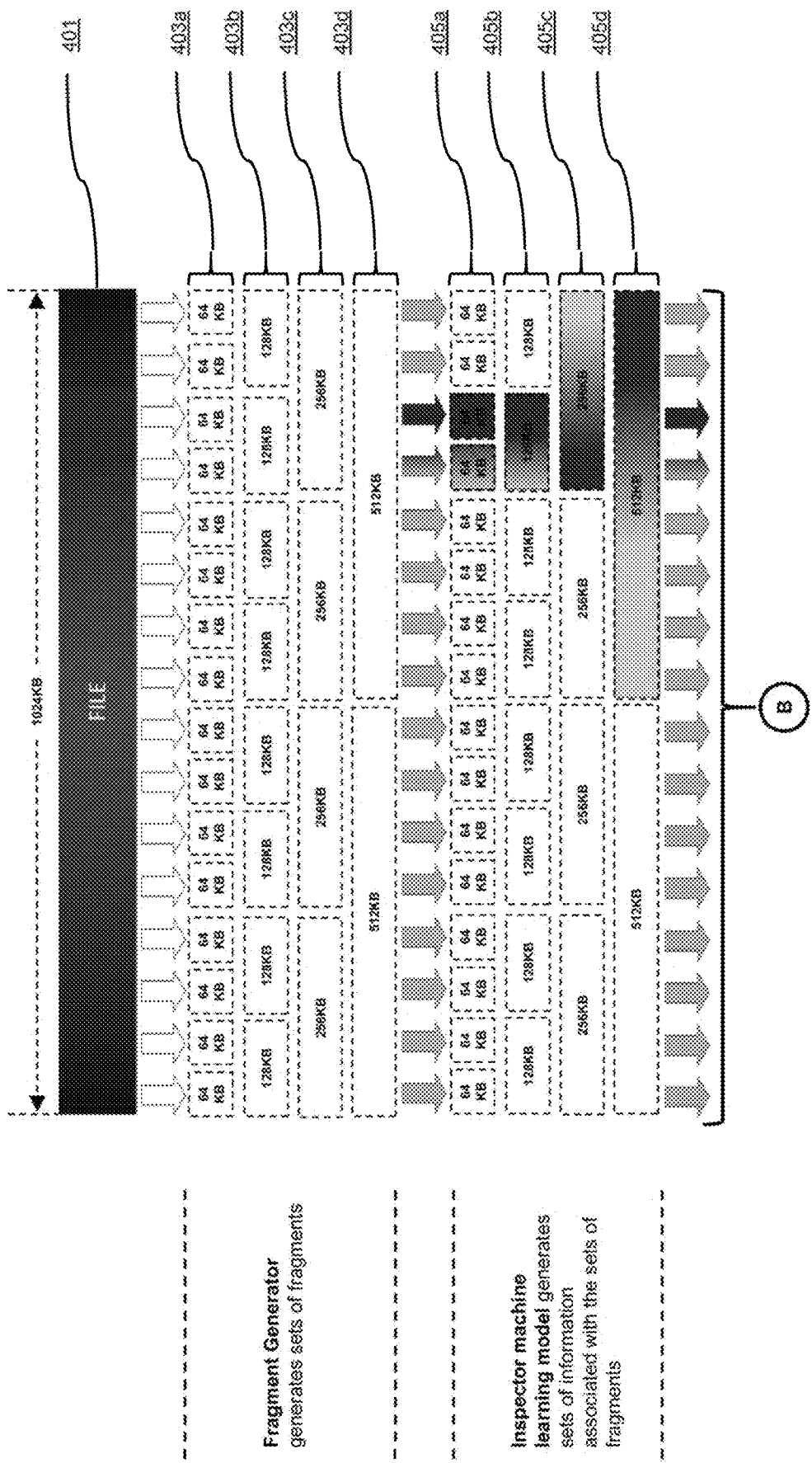
FIGS. 4a and 4b are schematic illustrations of a method of determining whether a file is malicious, according to an embodiment.
Figure 4B:
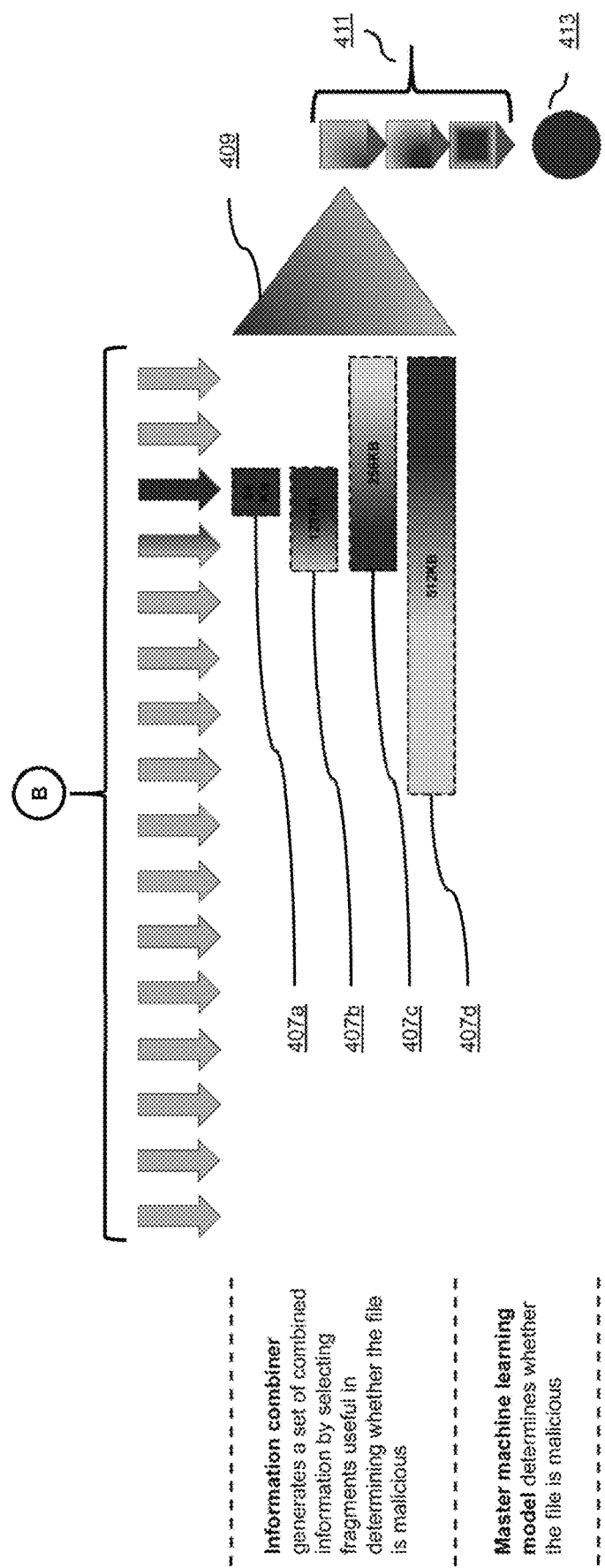

FIGS. 4a and 4b are schematic illustrations of a method of determining whether a file is malicious, according to an embodiment. A file 401 having size of 1024 Kilobytes (KB) is retrieved by a processor from a memory. A fragment generator can be configured to generate four sets of fragments for the file 401. The fragment generator can be configured to generate a first set of fragments 403a containing 16 fragments, each including 64 KB of the file 401. The fragment generator can be configured to generate a second set of fragments 403b containing 8 fragments, each including 128 KB of the file 401. Each of the fragments from the second set of fragments 403b can be generated by coalescing and/or combining two adjacent fragments from the first set of fragments 403a. The fragment generator can be configured to generate a third set of fragments 403c containing 4 fragments each including 256 KB of the file 401. Each of the fragments from the third set of fragments 403c can be generated by coalescing two adjacent fragments from the second set of fragments 403b. The fragment generator can be configured to generate a fourth set of fragments 403d containing 2 fragments each including 512 KB of the file 401. Each of the fragments from the fourth set of fragments 403d is generated by coalescing two adjacent fragments from the third set of fragments 403c. The fragment generator can be configured to store the first, the second, the third and the fourth set of fragments (403a, 403b, 403c and 403d) in the memory.

An inspector machine learning module can be configured to retrieve the four sets of fragments (403a, 403b, 403c and 403d) from the memory. As described herein, the inspector machine learning model can be configured to analyze the retrieved sets of fragments (403a, 403b, 403c and 403d). The inspector machine learning model can be configured to analyze the first set of fragments 403a to generate a first set of information 405a. Similarly, the inspector machine learning model can be configured to analyze the second set of fragments 403b, the third set of fragments 403c and the fourth set of fragments 403d to generate a second set of information 405b, a third of information 405c and a fourth set of information 405d, respectively. The inspector machine learning model can be configured to store the first set of information 405a, the second set of information 405b, the third set of information 405c and the fourth set of information 405d in the memory.

Referring now to FIG. 4b, the information combiner can be configured to retrieve the four sets of information (405a, 405b, 405c and 405d) from the memory. The information combiner is configured to analyze the first set of information 405a and to select from the first set of information, a portion of information 407a from the first set of information 405a and associated with a fragment from the first set of fragments 403a. The selected portion of information 407a can disclose indicative information that can help to determine whether the file 401 is malicious or not. In some instances, the portion of information 407a selected from the first set of information 405a is the information from the analysis of a fragment that is most indicative, helpful and/or useful in determining whether the file 401 is malicious. Thus, for example, if information identified in two separate fragments from the first set of fragments is useful in determining whether the file 401 is malicious, the information having a highest level of usefulness and/or applicability (as identified by the inspector machine learning model and/or the information combiner) will be selected. Accordingly, in such instances, information from a single fragment from the first set of fragments can be selected.

Similarly, the information combiner is configured to analyze the second set of information 405b, the third set of information 405c and the fourth set of information 405d to select a portion of information 407b from the second set of information 405b and associated with a fragment from the second set of fragments 403b, a portion of information 407c from the third set of information 405c and associated with a fragment from the third set of fragments 403c, and a portion of information 407d from the fourth set of information 405d and associated with a fragment from the fourth set of fragments 403d, respectively. The information combiner can select the portion of information 407b from the second set of information 405b, the portion of information 407c from the third set of information 405c and the portion of information 407d from the fourth set of information 405d similar to selecting the portion of information 407a from the first set of information 405a. As represented by 409, the information combiner can be configured to generate a set of combined information and store the set of combined information in the memory. As shown in FIG. 4b, in some instances the set of combined information can include the portion of information 407a from a fragment from the first set of fragments 403a, the portion of information 407b from a fragment from the second set of fragments 403b, the portion of information 407c from a fragment from the third set of fragments 403c, and the portion of information 407d from a fragment from the fourth set of fragments 403d.

In other instances, any other information from any other fragment from any of the sets of fragments can be selected. For example, in some instances information from multiple fragments from the first set of fragments can be selected.

A master machine learning model can be configured to retrieve the set of combined information from the memory. As represented by 411, the master machine learning model can be configured to analyze the set of combined information to determine whether the file 401 is malicious or not. As represented by 413, the master machine learning model can be configured to provide an output disclosing whether, the file 401 is malicious or not.

Figure 5:
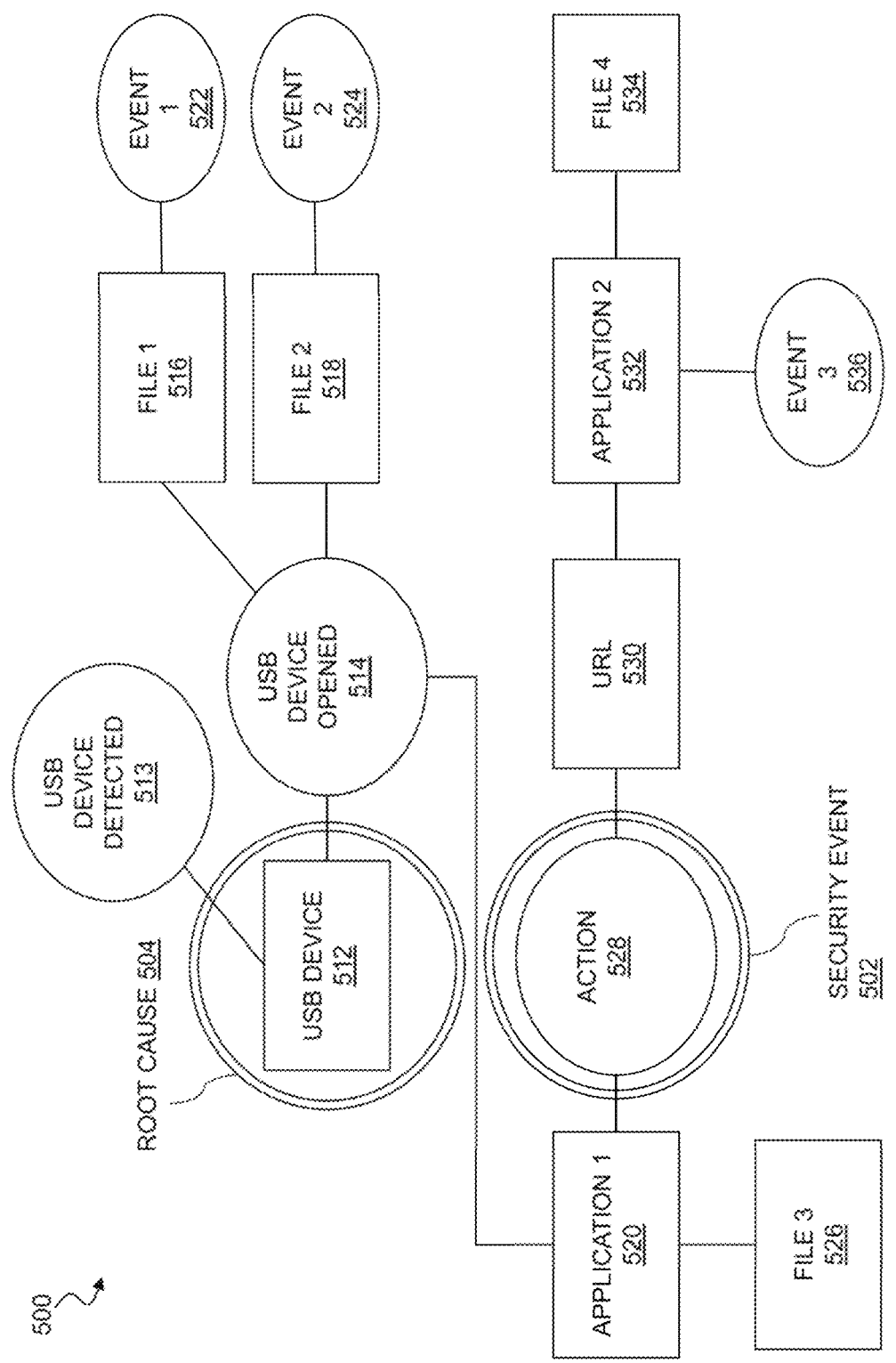
FIG. 5 illustrates a graphical depiction of a portion of an example event graph, according to an embodiment.

FIG. 5 illustrates a graphical depiction of a portion of an example event graph 500 used in some embodiments to record the results of a master machine learning model (e.g., master machine learning model 112, shown and described with respect to FIG. 1) and other information about a target device, for example, an endpoint. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously, periodically and/or sporadically generated to serve as, or be a part of, the data log obtained by the data recorder. In any case, an event graph 500, or a portion of an event graph 500 in a window before or around the time of a security event, may be obtained and analyzed after a security event 502 occurs to determine its root cause 504. The event graph 500 depicted in FIG. 5 is provided by way of example only, and it will be understood that many other forms and contents for event graphs 500 are also or instead possible. It also will be understood that the figure illustrates a graphical depiction of an event graph 500, which may be stored in a database or other suitable data structure.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read its contents. The USB device 512 may be detected 513 and contents of the USB device 512 may be opened 514, e.g., by a user of the endpoint. The USB device 512 may include one or more files and applications, e.g., a first file 516, a second file 518, and a first application 520. The first file 516 may be associated with a first event 522, for example, by a determination that the first file 516 is potentially or actually malicious as described above, for example, with respect to FIGS. 4a-4b. The second file may be associated with a second event 524, for example, that it is potentially or actually malicious, based on a determination as described herein.

The first application 520 may access one or more files on the endpoint, e.g., the third file 526 shown in FIG. 5. The first application 520 may also or instead perform one or more actions 528, such as accessing a URL 530. Accessing the URL 530 may download or run a second application 532 on the endpoint, which in turn accesses one or more files (e.g., the fourth file 534 shown in FIG. 5) or is associated with other events (e.g., the third event 536 shown in FIG. 5).

In the example provided by the event graph 500 depicted in FIG. 5, the detected security event 502 may include an action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. The URL 530 may involve the downloading of file 534. When file 4 534 is downloaded, the techniques described above may be applied, for example at a network gateway or at an endpoint, and a determination made that file 4 534 is potentially malicious using the techniques described above for example with regard to FIGS. 4a-4b.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in FIG. 5. In an aspect, the one or more cause identification rules are applied to computing objects preceding the detected security event 502 until a cause of the security event 502 is identified.

In the example shown in FIG. 5, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second file 518 potentially may be corrupted because the USB device 512 included malicious content. Similarly, any related actions performed after the security event 502 such as any actions performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive and the USB device being detected 513.

It will be appreciated that the event graph 500 depicted in FIG. 5 is an abstracted, simplified version of actual nodes and events on an endpoint for demonstration. Numerous other nodes and edges can be present in a working computing environment. For example, when a USB device is coupled to an endpoint, the new hardware can first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. These operations may require multiple operating system calls, file system accesses, hardware abstraction layer interaction, and so forth, which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. For example, the C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in FIG. 5 may include any number of nodes and edges, where computing objects are represented by nodes and events are represented by edges that mark the causal or otherwise directional relationships between computing objects such as data flows, control flows, network flows and so forth. While processes or files can be represented as nodes in such a graph, any other computing object such as an IP address, a registry key, a domain name, a uniform resource locator, a command line input or other object may also or instead be designated to be represented as a node in an event graph as contemplated herein. Similarly, while an edge may represent an IP connection, a file read, a file write, a process invocation (parent, child, etc.), a process path, a thread injection, a registry write, a domain name service query, a uniform resource locator access and so forth other edges may be designated and/or represent other events. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
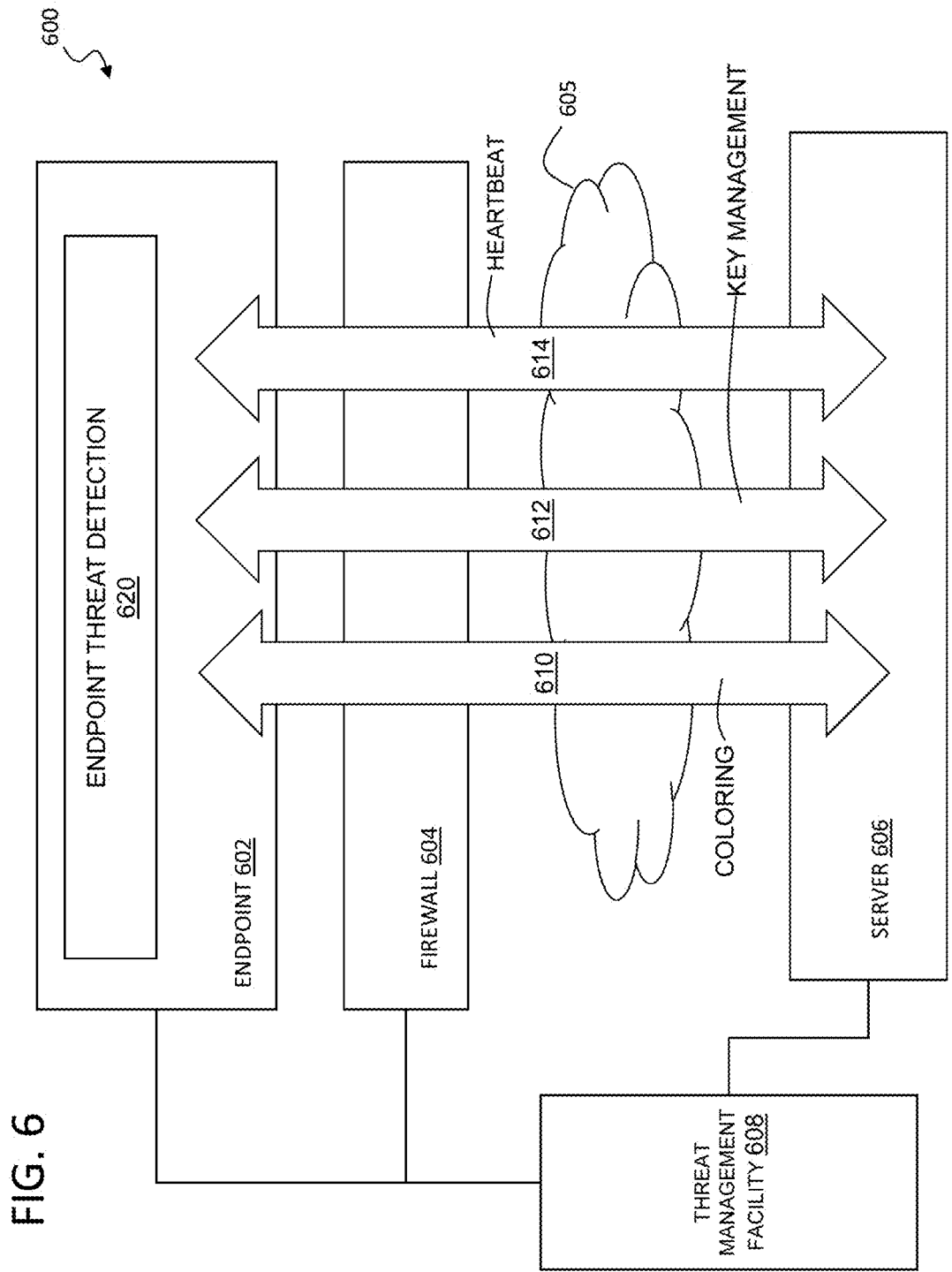
FIG. 6 illustrates a threat management system, according to an embodiment.

FIG. 6 illustrates a threat management system according to some implementations. In general, the system 600 may include an endpoint 602, a firewall 604, a server 606 and a threat management facility 608, coupled to one another directly or indirectly through a data network 605, as generally described above. Each of the entities depicted in FIG. 6 may, for example, be implemented on one or more computing devices, network devices, mobile devices, etc. A number of systems may be distributed across these various components to support threat detection, such as a coloring system 610, a key management system 612 and a heartbeat system 614 (or otherwise an endpoint health system), each of which may include software components executing on any of the foregoing system components (e.g., processors similar to processor 110 shown and described with respect to FIG. 1), and each of which may communicate with the threat management facility 608 and an endpoint threat detection agent 620 executing on the endpoint 602 (e.g., executing on a processor of the endpoint 602) to support improved threat detection and remediation.

The coloring system 610 may be used to label or 'color' software objects for improved tracking and detection of potentially harmful activity. The coloring system 610 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 610 as contemplated herein. The assignment of colors may be an event that is recorded in the event graph 500 (FIG. 5).

The key management system 612 may support management of keys for the endpoint 602 in order to selectively permit or prevent access to content on the endpoint 602 on a file-specific basis, a process-specific basis, an application-specific basis, a user-specific basis, or any other suitable basis in order to prevent data leakage, and in order to support more fine-grained and immediate control over access to content on the endpoint 602 when a security compromise is detected. Thus, for example, if a particular process executing on the endpoint is compromised, or potentially compromised or otherwise under suspicion, access by that process may be blocked (e.g., with access to keys revoked) in order to prevent, e.g., data leakage or other malicious activity. Depending on the policies in place, the key management system 612 may be triggered, for example, by output from a master machine learning model (e.g., master machine learning model 112 of FIG. 1 or master machine learning model of FIG. 4b), by a combination of the output of the master machine learning model with other information, by the coloring system, by a detection based on the event graph 500 and/or by any other suitable trigger.

The heartbeat system 614 may be used to provide periodic or aperiodic information from the endpoint 602 or other system components about system health, security, status, and/or so forth. The heartbeat system 614 or otherwise an endpoint health system may thus in general include a health status report system for the endpoint 602, such as through the use of a heartbeat system or the like. A heartbeat may be encrypted or plaintext, or some combination of these, and may be communicated unidirectionally (e.g., from the endpoint 602 to the threat management facility 608) or bidirectionally (e.g., between the endpoint 602 and the server 606, or any other pair of system components) on any useful schedule. The heartbeat system 614 may be used to communicate an identification of malicious or potentially malicious files using the techniques described herein to or from an endpoint and/or a firewall and/or a server and/or a threat management facility.

In general, these various monitoring and management systems may cooperate to provide improved threat detection and response. For example, the coloring system 610 may be used when a particular file is identified as malicious or potentially malicious, as described, for example, using the machine learning models described with respect to FIGS. 4a and 4b. The detection may be recorded as an event in an event graph, for example as described with respect to FIG. 5. A color may be assigned to the file, and the assignment of the color to the file included as an event in an event graph as described with respect to FIG. 5. A potential threat may be confirmed based on an interrupted heartbeat from the heartbeat system 614 and/or based on assigned colors or events in the event graph 500. The key management system 612 may then be deployed to revoke access by the process to certain resources (e.g., keys or file) so that no further files can be opened, deleted or otherwise modified. More generally, the cooperation of these systems enables a wide variety of reactive measures that can improve detection and remediation of potential threats to an endpoint.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

In other embodiments, the malware detection device can be implemented as a plug-in for an interne browser. The malware detection device can be configured to analyze different website(s) to determine if the websites are malicious. Furthermore, the malware detection device can be configured to analyze downloaded file(s), executables, and/or the like. In yet other instances, the malware detection device can be a part of computer security software such as, for example, an anti-virus program, a malware protection program and/or the like.

In yet other embodiments, the malware detection device can be stored in a cloud platform. The malware detection device can be executed remotely on a computing device for example, a computer, a smartphone, a tablet, a laptop, a server and/or the like. For example, referring briefly again to FIG. 6, a malware detection device may be included in an endpoint 602, a firewall 604, a server 606, a threat management facility 608, and/or some combination (e.g., as a distributed system across devices).

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
receiving a potentially malicious file;
splitting data of the potentially malicious file into a first set of fragments, each fragment from the first set of fragments having a same first size;
splitting the data of the potentially malicious file into a second set of fragments, each fragment from the second set of fragments having a same second size different than the first size;
providing the first set of fragments to a machine learning model to identify a first fragment, the first fragment being from the first set of fragments and including information potentially relevant to a determination of whether the potentially malicious file is malicious;
providing the second set of fragments to the machine learning model to identify a second fragment, the second fragment being from the second set of fragments and including information potentially relevant to a determination of whether the potentially malicious file is malicious; and
determining, based on a combination of the first fragment and the second fragment identified by the machine learning model, that the potentially malicious file is malicious.

2. The method of claim 1, wherein the first size is a first number of bytes and the second size is a second number of bytes different than the first number of bytes.

3. The method of claim 1, wherein the first fragment at least partially overlaps the second fragment.

4. The method of claim 1, wherein the first fragment does not overlap the second fragment.

5. The method of claim 1, further comprising:
performing a remedial action on the potentially malicious file based on determining the potentially malicious file is malicious.

6. The method of claim 1, wherein the first size and the second size are determined based on a size of the potentially malicious file.

7. The method of claim 1, wherein the first size and the second size are predetermined.

8. The method of claim 1, further comprising:
splitting the data of the potentially malicious file into a third set of fragments, each fragment from the third set of fragments having a same third size different than the first size and the second size; and
providing the third set of fragments to the machine learning model to identify a third fragment, the third fragment being from the third set of fragments and including information potentially relevant to a determination of whether the potentially malicious file is malicious,
the determining is based on the first fragment, the second fragment and the third fragment.

9. A non-transitory processor-readable medium storing code representing instructions to be executed by one or more processors, the instructions comprising code to cause the one or more processors to:
receive a potentially malicious file;
split data of the potentially malicious file into a first set of fragments, each fragment from the first set of fragments having a common first number of bytes from the potentially malicious file;
split the data of the potentially malicious file into a second set of fragments, each fragment from the second set of fragments having a common second number of bytes from the potentially malicious file different than the common first number of bytes;
provide the first set of fragments to a machine learning model to identify a first fragment, the first fragment being from the first set of fragments and including information potentially relevant to a determination of whether the potentially malicious file is malicious;
provide the second set of fragments to the machine learning model to identify a second fragment, the second fragment being from the second set of fragments and including information potentially relevant to a determination of whether the potentially malicious file is malicious; and
identify, based on a combination of the first fragment and the second fragment from, whether the potentially malicious file is malicious.

10. The non-transitory processor-readable medium of claim 9, wherein the potentially malicious file is at least one of a Hypertext Markup Language (HTML) file, a JavaScript file, or a Hypertext Preprocessor (PHP) file.

11. The non-transitory processor-readable medium of claim 9, further comprising code to cause the one or more processors to:
perform a remedial action on the potentially malicious file based on identifying the potentially malicious file as malicious.

12. The non-transitory processor-readable medium of claim 9, wherein the code to cause the one or more processors to split data of the potentially malicious file into the first set of fragments includes code to cause the one or more processors to split data of the potentially malicious file into the first set of fragments based on at least one of a size of the potentially malicious file, a type of the potentially malicious file or a source of the potentially malicious file.

13. The non-transitory processor-readable medium of claim 9, wherein the common first number of bytes and the common second number of bytes are predetermined.

14. The non-transitory processor-readable medium of claim 9, wherein the common first number of bytes and the common second number of bytes are determined based on a size of the potentially malicious file.

15. The non-transitory processor-readable medium of claim 9, wherein the first fragment at least partially overlaps the second fragment.

16. An apparatus, comprising:
one or more memories; and
one or more hardware processors operatively coupled to the one or more memories, the one or more hardware processors configured to:
receive a potentially malicious file,
split the potentially malicious file into a first set of fragments, each fragment from the first set of fragments having a same first size,
define a second set of fragments of the potentially malicious file by combining fragments from the first set of fragments to define each fragment from the second set of fragments, each fragment from the second set of fragments having a same second size different than the first size,
provide the first set of fragments and the second set of fragments to a machine learning model to identify based on a combination of at least a first fragment and a second fragment whether the potentially malicious file is malicious, the first fragment being from the first set of fragments and including information potentially relevant to a determination of whether the potentially malicious file is malicious, the second fragment being from the second set of fragments and including information potentially relevant to a determination of whether the potentially malicious file is malicious, and
perform a remedial action on the potentially malicious file based on an output of the machine learning model identifying the potentially malicious file as malicious.

17. The apparatus of claim 16, wherein each fragment from the first set of fragments has a first predetermined common number of bytes, each fragment from the second set of fragments has a second predetermined common number of bytes different than the first predetermined common number of bytes.

18. The apparatus of claim 16, wherein the remedial action includes at least one of quarantining the potentially malicious file, notifying a user that the potentially malicious file is malicious, displaying an indication that the potentially malicious file is malicious or removing the potentially malicious file.

19. The apparatus of claim 16, wherein the one or more hardware processors are configured to:
define a third set of fragments of the potentially malicious file by combining multiple fragments from the second set of fragments to define each fragment from the third set of fragments, and
provide the first set of fragments, the second set of fragments and the third set of fragments to the machine learning model to identify whether the potentially malicious file is malicious.

20. The apparatus of claim 16, wherein the potentially malicious file is at least one of a Hypertext Markup Language (HTML) file, a JavaScript file, or a Hypertext Preprocessor (PHP) file.

* * * * *